United States Patent
Park

(10) Patent No.: US 9,801,396 B2
(45) Date of Patent: Oct. 31, 2017

(54) PRODUCTION METHOD FOR NATURAL-EXTRACT BEVERAGE

(71) Applicants: TECH CORPORATION CO., LTD., Hiroshima (JP); CLEAR INC., Gunma (JP)

(72) Inventor: Choonok Park, Tokyo (JP)

(73) Assignee: TECH CORPORATION CO., LTD., Hiroshima (JP)

( * ) Notice: Subject to any disclaimer, the term of this patent is extended or adjusted under 35 U.S.C. 154(b) by 0 days.

(21) Appl. No.: 14/774,326

(22) PCT Filed: Mar. 7, 2014

(86) PCT No.: PCT/JP2014/001263
§ 371 (c)(1),
(2) Date: Sep. 10, 2015

(87) PCT Pub. No.: WO2014/141649
PCT Pub. Date: Sep. 18, 2014

(65) Prior Publication Data
US 2016/0037793 A1    Feb. 11, 2016

(30) Foreign Application Priority Data
Mar. 14, 2013    (JP) .................. 2013-052083

(51) Int. Cl.
*A23F 5/26*    (2006.01)
*C02F 1/44*    (2006.01)
(Continued)

(52) U.S. Cl.
CPC .................. *A23F 5/26* (2013.01); *A23F 3/18* (2013.01); *B01D 61/422* (2013.01); *C02F 1/20* (2013.01);
(Continued)

(58) Field of Classification Search
CPC . A23F 5/26; A23F 3/18; B01D 61/422; C02F 1/20
(Continued)

(56) References Cited

U.S. PATENT DOCUMENTS 2,176,082 A  * 10/1939 Kise ...................... A47J 31/106
                                                          392/313
2010/0062113 A1 * 3/2010 Sumita ................. A61K 9/0095
                                                          426/67

FOREIGN PATENT DOCUMENTS

JP          2005-144398       6/2005
JP             3120747        3/2006
(Continued)

OTHER PUBLICATIONS

International Search Report dated Jun. 3, 2014 in International Application No. PCT/JP2014/001263.
(Continued)

*Primary Examiner* — Helen F Heggestad
(74) *Attorney, Agent, or Firm* — Wenderoth, Lind & Ponack, L.L.P.

(57) ABSTRACT

[Problem] To provide a production method for a natural-extract beverage which is coffee extraction or the like using electrolytically reduced water, wherein the oxidation-reduction potential of the extract is negative.
[Solution] A method for producing a natural-extract beverage by making coffee or tea with electrolytically reduced hot water containing dissolved hydrogen molecules, comprising making coffee or tea that an oxidation-reduction potential of the extract is made to be 0 mV or less by at least one means that suppresses volatilization of dissolved molecular hydrogen, wherein the at least one means are selected from the group consisting of: means of using electrolytically reduced water obtained by electrolysis of heated source water, means of performing the extraction under high pressure in a sealed
(Continued)

7. FILTER
9. ELECTROLYTIC EXTRACT RECEIVER
121. DISSOLVED-HYDROGEN STABILIZING AGENT INJECTOR
24. COMPACT POROUS ANODE ELECTRODE
25. COMPACT DIAPHRAGM
31. ELECTROLYTIC CELL-HEATING CONTAINER
32. COMPACT HEATER container, and means of adding to the electrolytically reduced water at least one dissolved-hydrogen stabilizing agent selected from polysaccharides and/or polyphenols.

11 Claims, 18 Drawing Sheets

(51) Int. Cl.
  *C02F 1/467*  (2006.01)
  *A23F 3/18*  (2006.01)
  *B01D 61/42*  (2006.01)
  *C02F 1/20*  (2006.01)
  *C02F 1/68*  (2006.01)
  *C02F 1/28*  (2006.01)
  *C02F 1/42*  (2006.01)

(52) U.S. Cl.
  CPC ............ *C02F 1/441* (2013.01); *C02F 1/4676* (2013.01); *C02F 1/281* (2013.01); *C02F 1/42* (2013.01); *C02F 1/68* (2013.01); *C02F 2201/46115* (2013.01)

(58) Field of Classification Search
  USPC ............... 426/271, 594, 597, 432, 433, 435
  See application file for complete search history.

(56) References Cited

FOREIGN PATENT DOCUMENTS

| | | |
|---|---|---|
| JP | 2007-750 | 1/2007 |
| JP | 2012-13359 | 1/2012 |
| KR | 0059860 A1 * | 7/2008 |
| KR | 2010127907 * | 12/2010 |
| KR | 044447 A1 * | 4/2014 |

OTHER PUBLICATIONS

Extended European Search Report dated Jul. 15, 2016 in corresponding European Patent Application No. 14762838.2.

* cited by examiner

6. ANODE CHAMBER
62. ANODE CHAMBER INLET
63. ANODE CHAMBER OUTLET
61. ANODE ELECTRODE
51. DIAPHRAGM
4. CATHODE CHAMBER
42. CATHODE CHAMBER INLET
43. CATHODE CHAMBER OUTLET
41. CATHODE ELECTRODE

6. ANODE CHAMBER
62. ANODE CHAMBER INLET
63. ANODE CHAMBER OUTLET
61. ANODE ELECTRODE
51. DIAPHRAGM
4. CATHODE CHAMBER
42. CATHODE CHAMBER INLET
43. CATHODE CHAMBER OUTLET
41. CATHODE ELECTRODE

FIG.3(a)

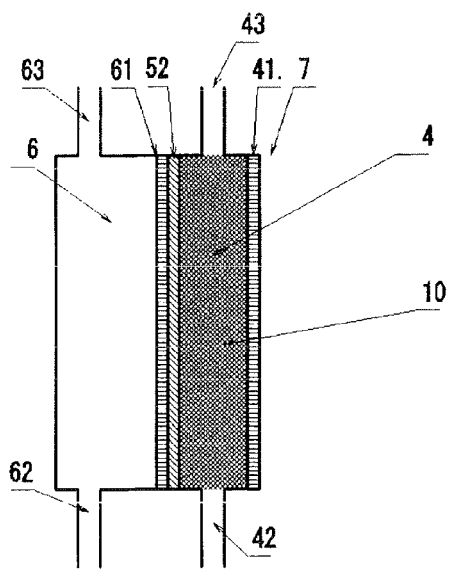

6. ANODE CHAMBER
62. ANODE CHAMBER INLET
63. ANODE CHAMBER OUTLET
61. ANODE ELECTRODE
52. FLUORINE-CONTAINING CATION
    EXCHANGE MEMBRANE
4. CATHODE CHAMBER
41. CATHODE ELECTRODE
42. CATHODE CHAMBER INLET
43. CATHODE CHAMBER OUTLET
10. ION EXCHANGE RESIN

FIG.3(b)

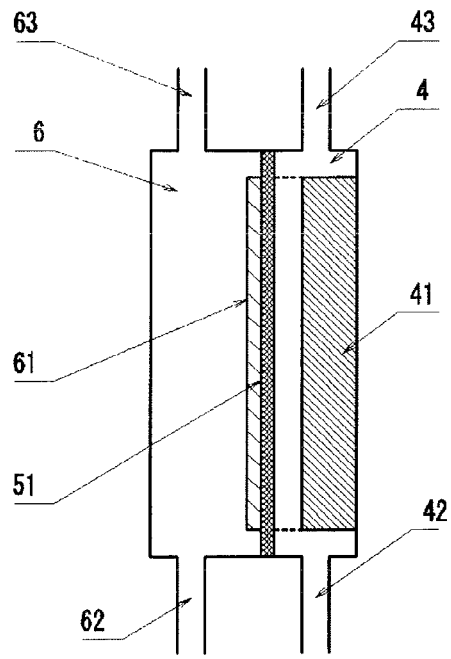

6. ANODE CHAMBER
62. ANODE CHAMBER INLET
63. ANODE CHAMBER OUTLET
61. ANODE ELECTRODE
51. DIAPHRAGM
4. CATHODE CHAMBER
42. CATHODE CHAMBER INLET
43. CATHODE CHAMBER OUTLET
41. CATHODE ELECTRODE

FIG.3(c)

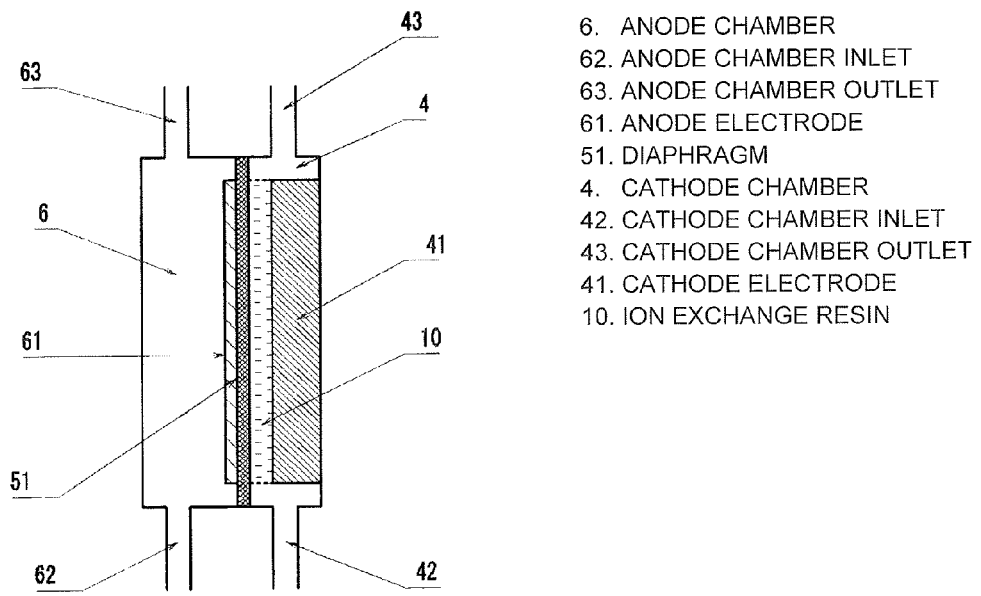

6. ANODE CHAMBER
62. ANODE CHAMBER INLET
63. ANODE CHAMBER OUTLET
61. ANODE ELECTRODE
51. DIAPHRAGM
4. CATHODE CHAMBER
42. CATHODE CHAMBER INLET
43. CATHODE CHAMBER OUTLET
41. CATHODE ELECTRODE
10. ION EXCHANGE RESIN

FIG.4(a)

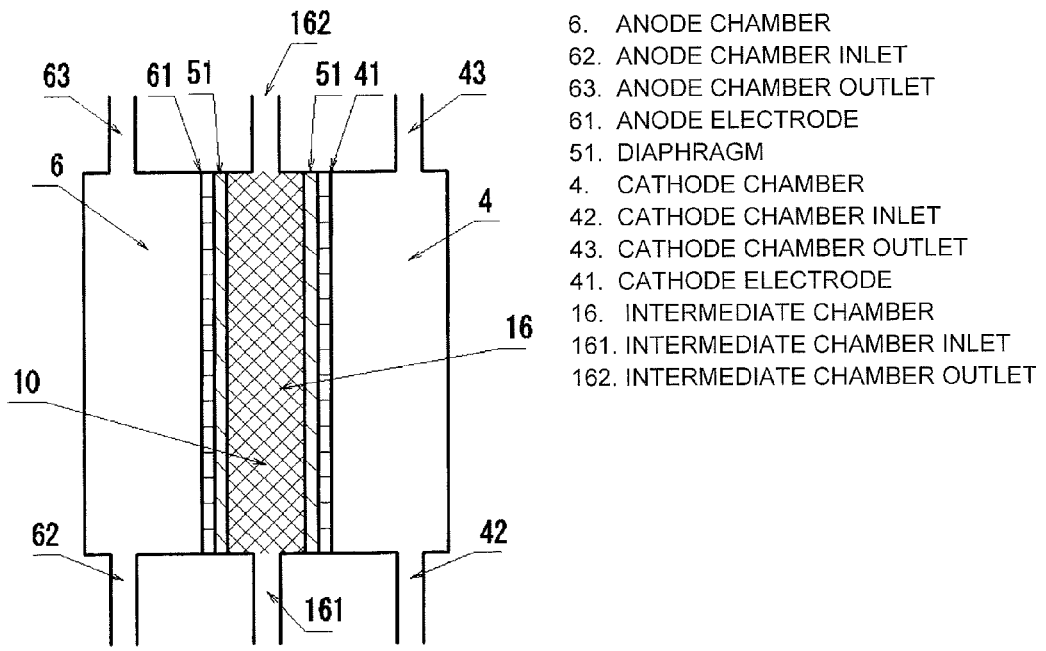

6. ANODE CHAMBER
62. ANODE CHAMBER INLET
63. ANODE CHAMBER OUTLET
61. ANODE ELECTRODE
51. DIAPHRAGM
4. CATHODE CHAMBER
42. CATHODE CHAMBER INLET
43. CATHODE CHAMBER OUTLET
41. CATHODE ELECTRODE
16. INTERMEDIATE CHAMBER
161. INTERMEDIATE CHAMBER INLET
162. INTERMEDIATE CHAMBER OUTLET

6. ANODE CHAMBER
62. ANODE CHAMBER INLET
63. ANODE CHAMBER OUTLET
61. ANODE ELECTRODE
51. DIAPHRAGM
4. CATHODE CHAMBER
42. CATHODE CHAMBER INLET
43. CATHODE CHAMBER OUTLET
41. CATHODE ELECTRODE
10. ION EXCHANGE RESIN
16. INTERMEDIATE CHAMBER
161. INTERMEDIATE CHAMBER INLET
162. INTERMEDIATE CHAMBER OUTLET

41. CATHODE ELECTRODE
10. ION EXCHANGE RESIN
51. DIAPHRAGM

1. REVERSE OSMOSIS MEMBRANE DEVICE
2. HEATER (CONTAINER)
4. CATHODE CHAMBER
5. ELECTROLYTIC CELL
6. ANODE CHAMBER
7. FILTER
8. EXTRACT RECEIVER
11. TAP WATER

1. REVERSE OSMOSIS MEMBRANE DEVICE
2. HEATER (CONTAINER)
4. CATHODE CHAMBER
5. ELECTROLYTIC CELL
6. ANODE CHAMBER
7. FILTER
8. EXTRACT RECEIVER
11. TAP WATER

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT INJECTOR
19. DEGASSING DEVICE

FIG.12(c)

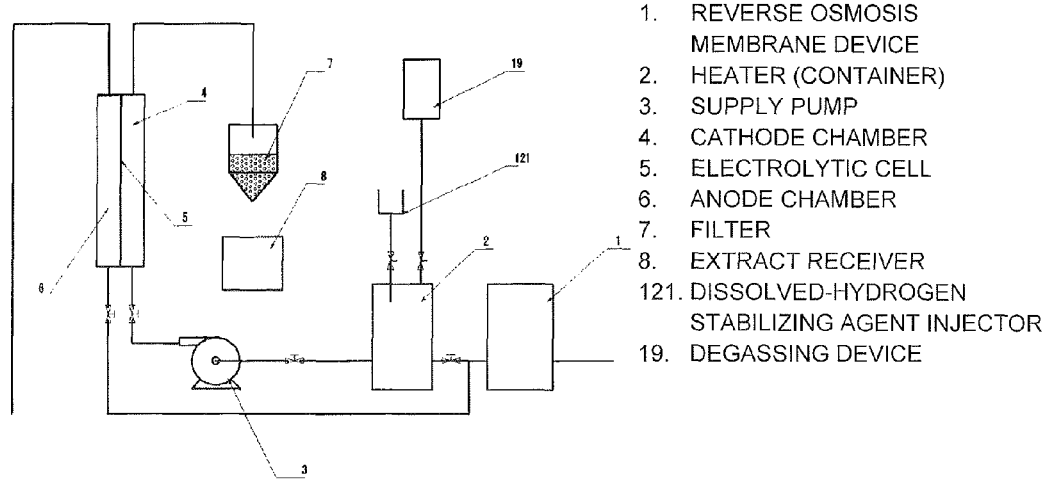

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT INJECTOR
19. DEGASSING DEVICE

FIG.13

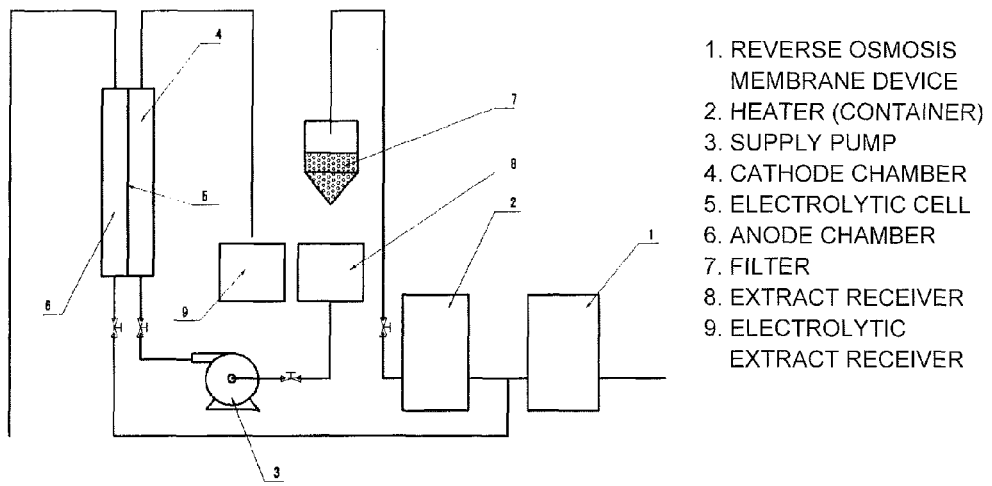

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
9. ELECTROLYTIC EXTRACT RECEIVER

FIG.14(a)

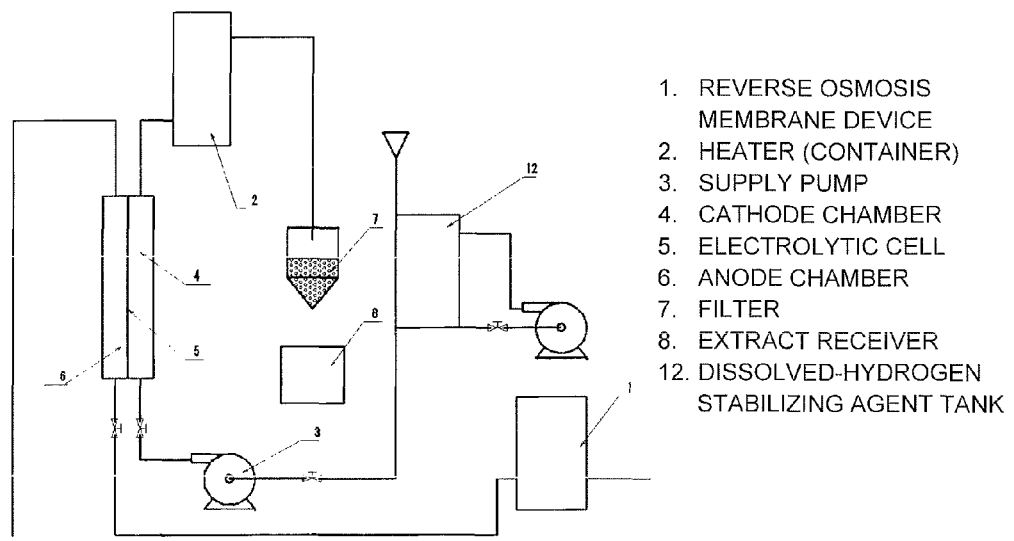

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
12. DISSOLVED-HYDROGEN STABILIZING AGENT TANK

FIG.14(b)

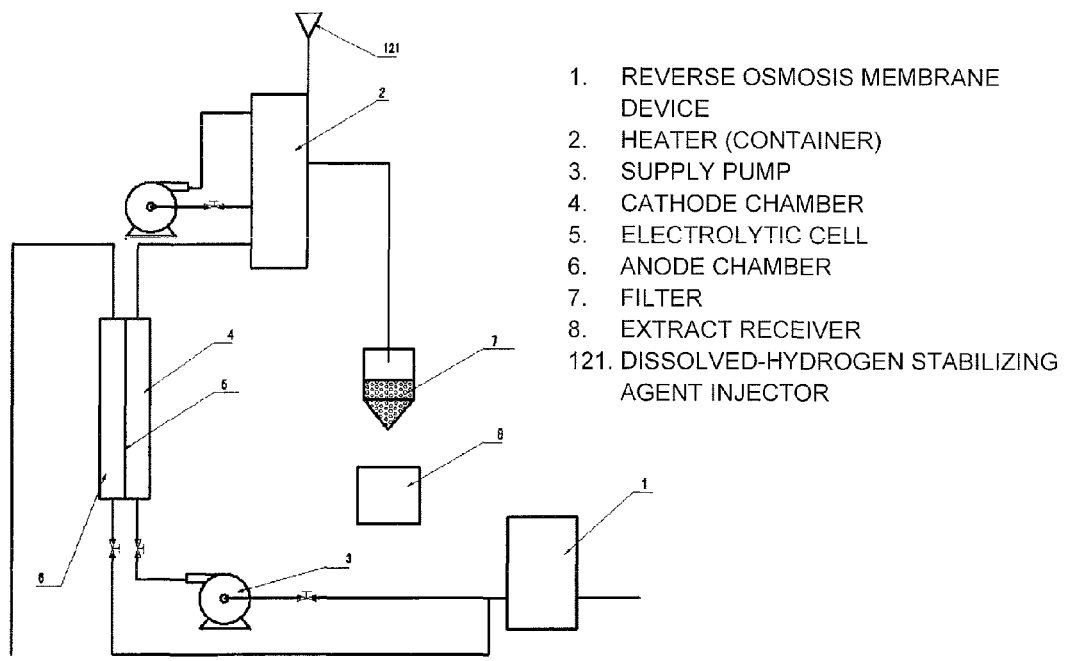

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT INJECTOR

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
12. DISSOLVED-HYDROGEN STABILIZING AGENT TANK
14. WASHING PUMP

FIG.16

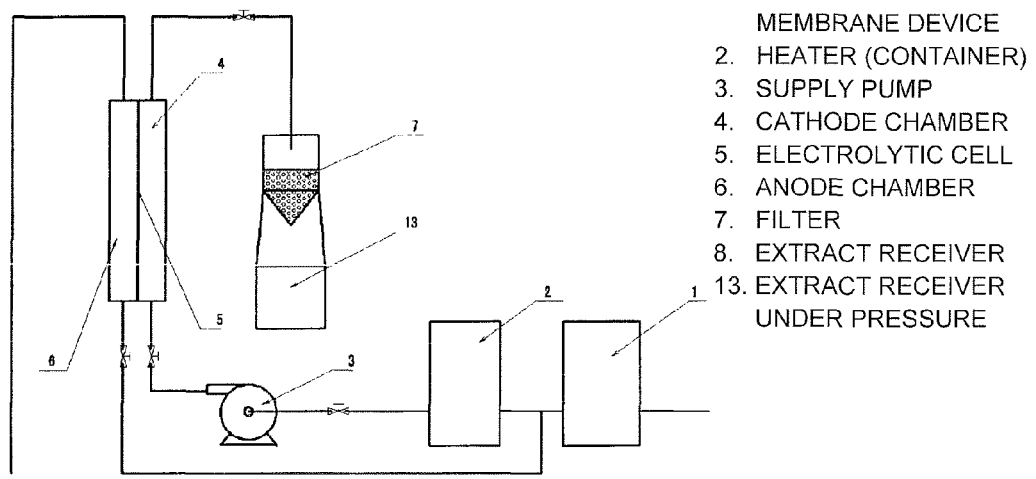

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
13. EXTRACT RECEIVER UNDER PRESSURE

FIG.17

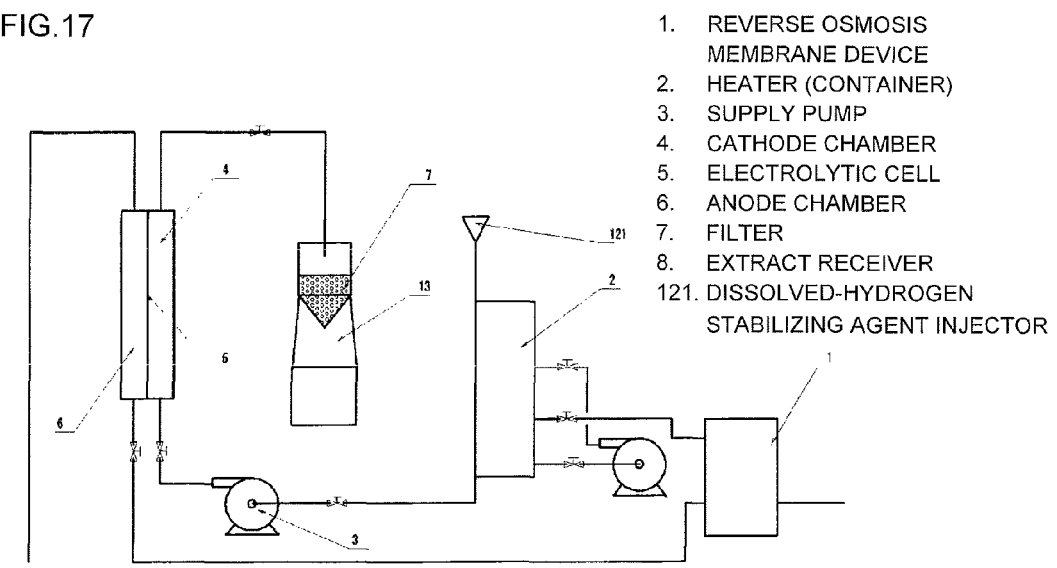

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT INJECTOR

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT INJECTOR
13. EXTRACT RECEIVER UNDER PRESSURE

21. COMPACT EXTRACTOR
22. FILTER
23. COMPACT ELECTROLYTIC CELL
24. COMPACT POROUS ANODE ELECTRODE
25. COMPACT DIAPHRAGM
26. COMPACT CATHODE ELECTRODE

FIG.19(b)

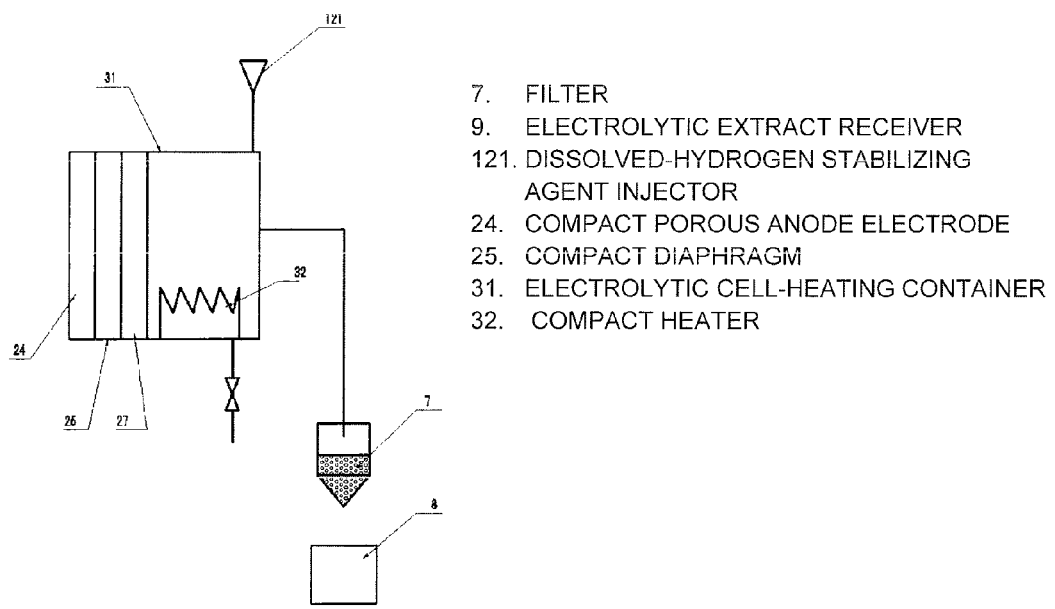

7. FILTER
9. ELECTROLYTIC EXTRACT RECEIVER
121. DISSOLVED-HYDROGEN STABILIZING AGENT INJECTOR
24. COMPACT POROUS ANODE ELECTRODE
25. COMPACT DIAPHRAGM
31. ELECTROLYTIC CELL-HEATING CONTAINER
32. COMPACT HEATER

FIG.20(a)

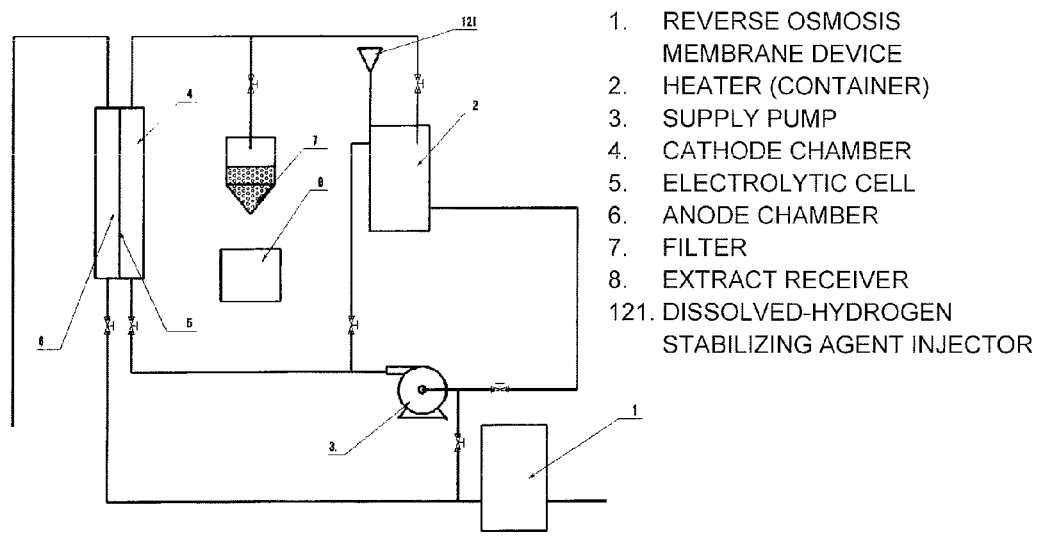

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT INJECTOR

FIG.20(b)

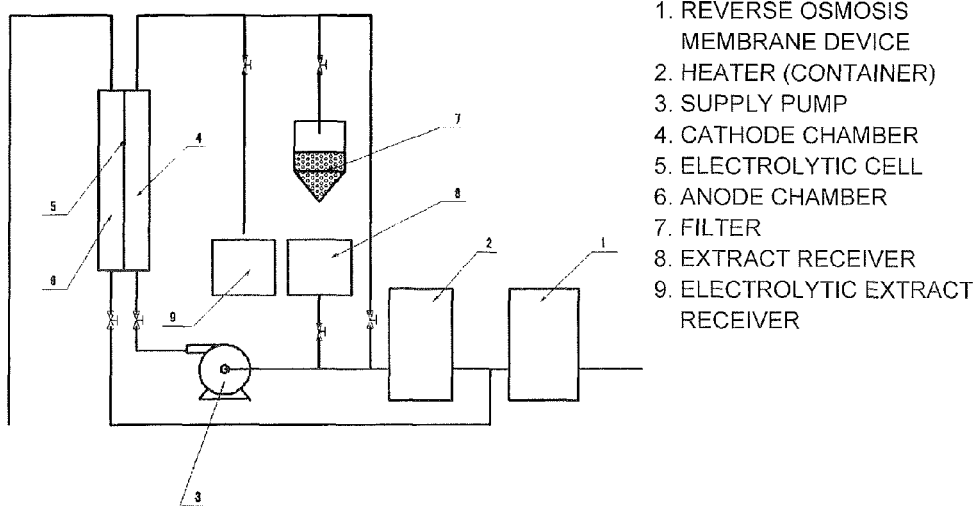

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
9. ELECTROLYTIC EXTRACT RECEIVER

FIG.20(c)

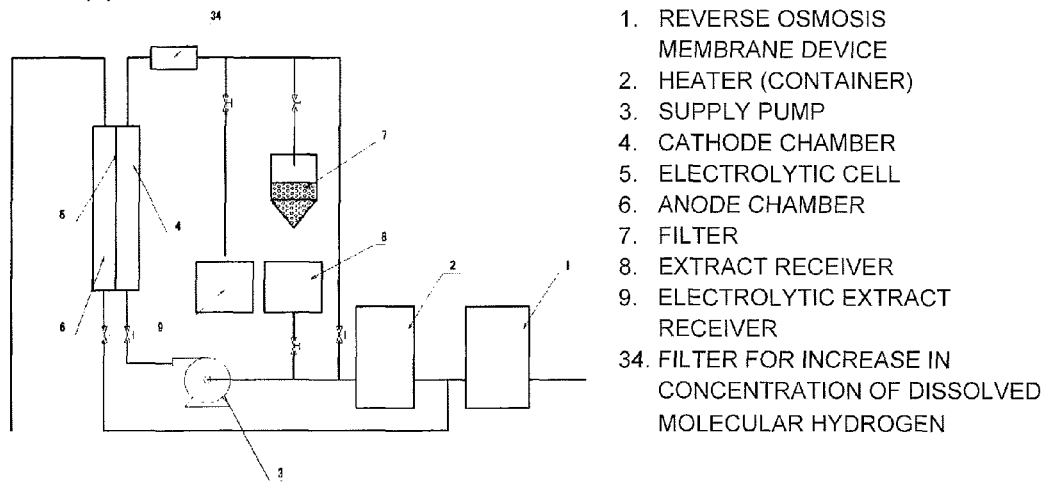

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
9. ELECTROLYTIC EXTRACT RECEIVER
34. FILTER FOR INCREASE IN CONCENTRATION OF DISSOLVED MOLECULAR HYDROGEN

FIG.21(a)

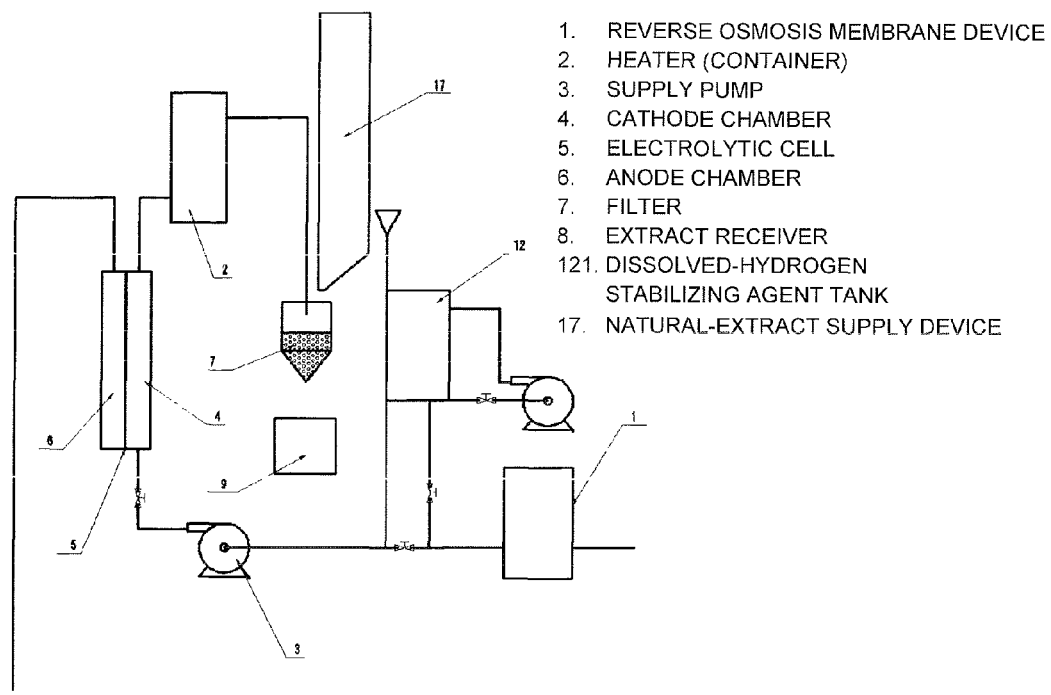

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT TANK
17. NATURAL-EXTRACT SUPPLY DEVICE

FIG.21(b)

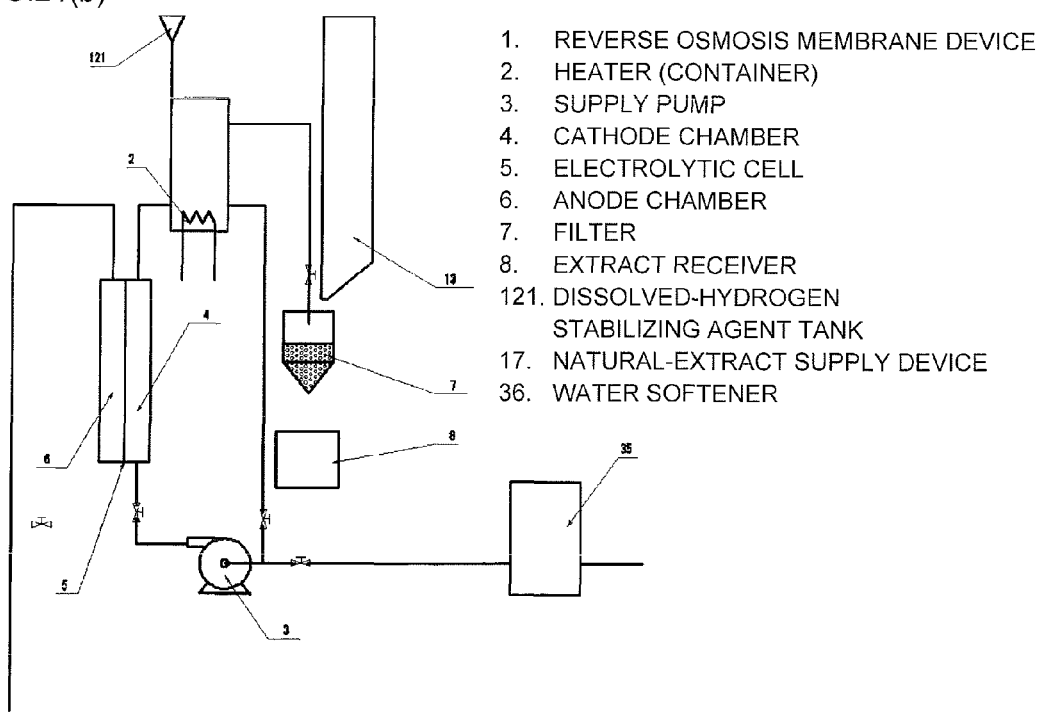

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT TANK
17. NATURAL-EXTRACT SUPPLY DEVICE
36. WATER SOFTENER

FIG.21(c)

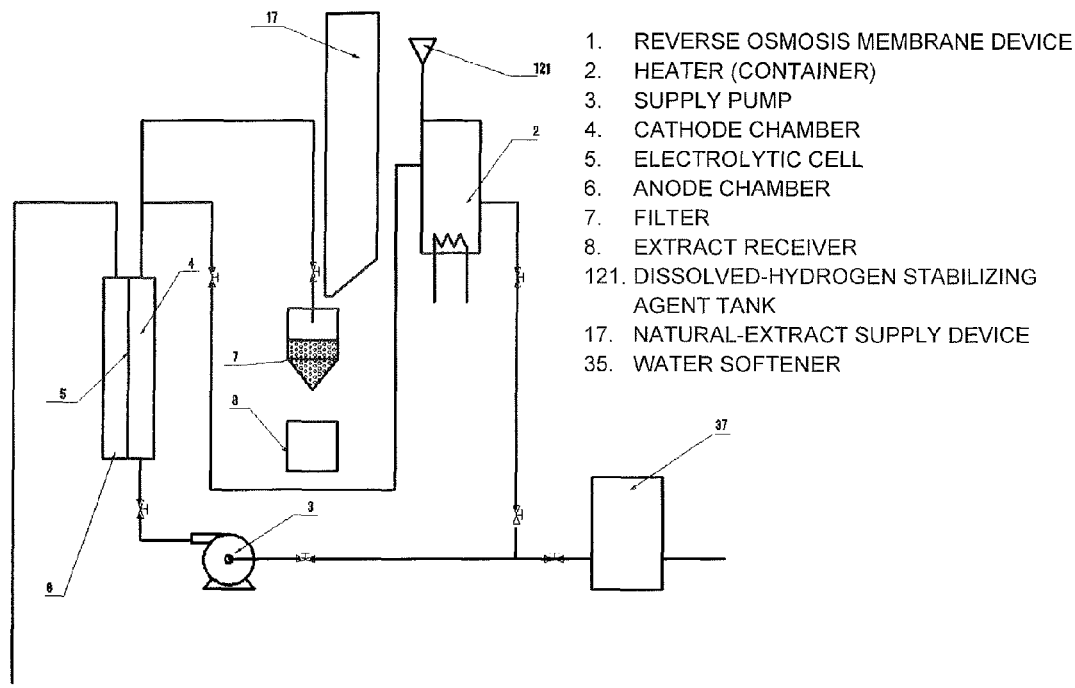

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT TANK
17. NATURAL-EXTRACT SUPPLY DEVICE
35. WATER SOFTENER

FIG.22(a)

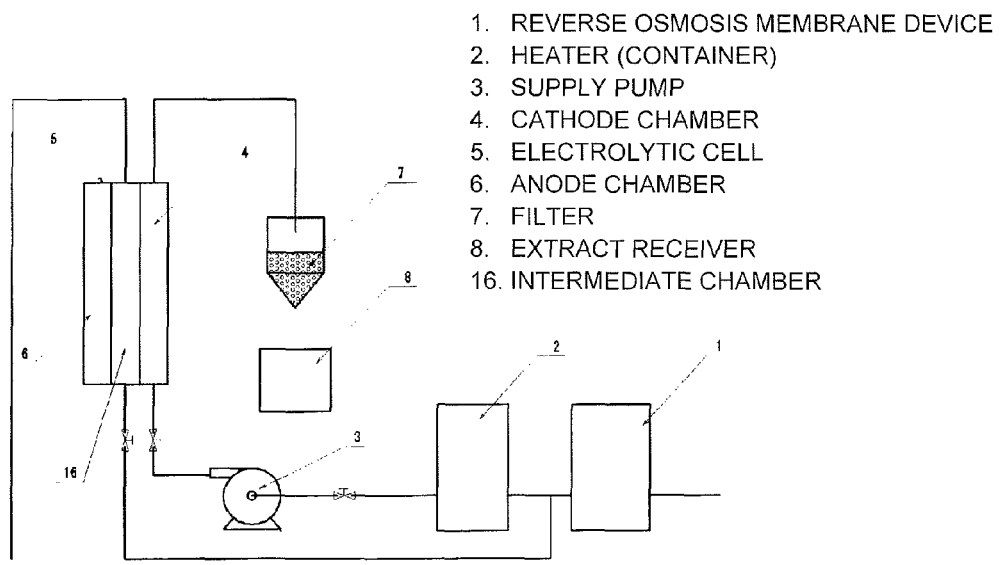

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
16. INTERMEDIATE CHAMBER

1. REVERSE OSMOSIS MEMBRANE DEVICE
2. HEATER (CONTAINER)
3. SUPPLY PUMP
4. CATHODE CHAMBER
5. ELECTROLYTIC CELL
6. ANODE CHAMBER
7. FILTER
8. EXTRACT RECEIVER
121. DISSOLVED-HYDROGEN STABILIZING AGENT TANK
16. INTERMEDIATE CHAMBER

PRODUCTION METHOD FOR NATURAL-EXTRACT BEVERAGE

TECHNICAL FIELD

The present invention relates to a production method for a reductive natural-extract beverage.

BACKGROUND ART

In recent years, relationships between reactive oxygen species and various diseases and aging have attracted attention. Examples of reactive oxygen species may include a superoxide anion, singlet oxygen ($^1O_2$), hydrogen peroxide ($H_2O_2$), and a hydroxyl radical (.OH). The reactive oxygen species have extremely high reactivity and are known to cause various problems.

Nucleic acids and proteins are oxidized by the reactive oxygen species. In particular, lipids are more sensitive to oxidation than nucleic acids and proteins. Of the reactive oxygen species, a hydroperoxyl radical (hereinafter referred to as radicals) is produced by oxidation of lipids constituting a cell membrane. Lipid peroxidation is an addition reaction of reactive oxygen species to an unsaturated fatty acid moiety in phospholipids as a component of a cell membrane. As a pathology, arteriosclerosis is widely known, which is caused by transforming macrophages that take up LDL having an oxidized lipid moiety into foam cells.

As an aging phenomenon that may be caused by reactive oxygen species/radicals, wrinkles, cataract, arthritis, and dementia are known.

Electrolytically reduced water containing hydrogen molecules has a negative oxidation-reduction potential, and is known to have an ability of scavenging the reactive oxygen species causing aging and diseases in the body, that is, antioxidation action. For health maintenance, drinking of electrolytically reduced water increases.

Further, a polyphenol contained in coffee has an ability of scavenging the reactive oxygen species, and there is a report in which coffee itself is effective in health maintenance.

For health maintenance, coffee obtained by extraction using electrolytically reduced water is drunk.

A conventional extraction method of coffee using electrolytically reduced water will be described with reference to FIG. 10. Basically, tap water 11 is supplied to an electrolytic cell. Cathode electrolytic water exiting from a cathode chamber 4 is heated by a heater (container) 2. A raw material for coffee or the like is subjected to extraction through a filter 7, and the produced extract is received by an extract receiver 8. As a method of effectively producing the extract from the raw material for coffee, an extraction method of coffee by supplying high-purity water obtained by purification of tap water as a source water with a reverse osmosis membrane device 1 to an electrolytic cell, as shown in FIG. 11, is known.

SUMMARY OF INVENTION

Technical Problem

However, when coffee is obtain by the extraction using electrolytically reduced water, the oxidation-reduction potential of the extract is +100 mV to +300 mV, which is in an oxidation state. As a result, it is expected that the extraction does not have the antiocidation activity.

It is an object of the present invention to provide a production method for a natural-extract beverage by which coffee or the like is subjected to extraction using electrolytically reduced water, wherein the oxidation-reduction potential of the extract is negative.

Solution to Problem

As a result of intensive study, it has been revealed that: the coffee extraction with electrolytically reduced water requires heating of the electrolytically reduced water, and the oxidation-reduction potential of the extract becomes positive since hydrogen molecules in the electrolytically reduced water are vaporized by heating.

The inventor has found that when coffee extraction is performed while volatilization of hydrogen molecules in electrolytically reduced water is suppressed, the oxidation-reduction potential of the extract can be made to be 0 mV or less, which is in a reduction state. Thus, the present invention has been completed.

Specifically, the present invention relates to the following:

(1) A method for producing a natural-extract beverage by making coffee or tea with electrolytically reduced hot water containing hydrogen molecules, comprising making coffee or tea that an oxidation-reduction potential of the extract is made to be 0 mV or less by at least one means suppressing volatilization of dissolved molecular hydrogen,
wherein the at least one means are selected from the group consisting of: means of using electrolytically reduced water obtained by electrolysis of heated source water, means of performing the extraction under high pressure in a sealed container, and means of adding to the electrolytically reduced water at least one dissolved-hydrogen stabilizing agent selected from any polysaccharides and polyphenols.

(2) The method for producing a natural-extract beverage according to (1), wherein the extract is further electrolyzed when the means suppressing volatilization of the hydrogen molecules is the means of using electrolytically reduced water obtained by electrolysis of heated source water.

(3) The method for producing a natural-extract beverage according to (1), wherein the source water is degassed during or before heating when the means that suppresses volatilization of the hydrogen molecules is the means of using electrolytically reduced water obtained by electrolysis of heated source water.

(4) The method for producing a natural-extract beverage according to (1), wherein the electrolytically reduced water is prepared by an electrolytic cell that includes a fluorine-containing cation exchange membrane as a diaphragm, and a porous anode electrode and a cathode electrode closely adhered to both sides of the diaphragm.

(5) The method for producing a natural-extract beverage according to (1), wherein the electrolytically reduced water is prepared by an electrolytic cell that includes a fluorine-containing cation exchange membrane as a diaphragm, and a porous anode electrode and an irregularity processed cathode electrode closely adhered to both sides of the diaphragm with the irregular face of the cathode electrode adhered to the diaphragm, and allows the source water to pass through the irregular face.

(6) The method for producing a natural-extract beverage according to (1), wherein the electrolytically reduced water is prepared by an electrolytic cell that includes an anode electrode, a cathode electrode, and a diaphragm that is a fluorine-containing cation exchange membrane, and in which an ion exchange resin is filled in between the fluorine-containing cation exchange membrane and the cathode electrode.

(7) The method for producing a natural-extract beverage according to (1), wherein the electrolytically reduced water is prepared by a three-chamber electrolytic cell that includes three chambers of an anode chamber, an intermediate chamber, and a cathode chamber, and has a structure in which the anode chamber, the intermediate chamber, and the cathode chamber are separated by a fluorine-containing cation exchange membrane, a porous anode electrode is closely adhered to the fluorine-containing cation exchange membrane on a side of the anode chamber, and a porous cathode electrode is closely adhered to the fluorine-containing cation exchange membrane on a side of the cathode chamber.

(8) The method for producing a natural-extract beverage according to any one of (4) to (7), wherein the electrolytically reduced water is prepared by electrolytically reducing water that has been treated by a reverse osmosis membrane.

(9) The method for producing a natural-extract beverage according to any one of (4) to (8), wherein the electrolytically reduced water is prepared by an electrolytic cell that is provided with a line of circulating the electrolytically reduced water.

(10) The method for producing a natural-extract beverage according to (9), wherein the line of circulating the electrolytically reduced water is provided with at least one means selected from the group consisting of means for treatment using a hollow fiber filter, means for providing a container filled with an ion exchange resin, and means for providing a container filled with zeolite.

(11) The method for producing a natural-extract beverage according to (9), wherein the line of circulating the electrolytically reduced water is provided with at least one means selected from means for treatment using a hollow fiber filter, means for providing a container filled with an ion exchange resin, and means for providing a container filled with zeolite.

Advantageous Effects of Invention

According to the method of the present invention, a natural-extract beverage having an oxidation-reduction potential of 0 mV or less in a reduction state can be produced. Accordingly, a beverage having excellent antioxidative action can be produced.

BRIEF DESCRIPTION OF DRAWINGS

FIG. 3A is a schematic cross-sectional view illustrating a structure of an embodiment of a two-chamber electrolytic cell.

FIG. 3B is a schematic cross-sectional view illustrating a structure of an embodiment of the two-chamber electrolytic cell.

FIG. 3C is a schematic cross-sectional view illustrating a structure of an embodiment of the two-chamber electrolytic cell.

FIG. 4A is a schematic cross-sectional view illustrating a structure of an embodiment of a three-chamber electrolytic cell.

FIG. 12C is a flow diagram illustrating the production method for a natural-extract beverage of the present invention.

FIG. 13 is a flow diagram illustrating the production method for a natural-extract beverage of the present invention.

FIG. 14A is a flow diagram illustrating the production method for a natural-extract beverage of the present invention.

FIG. 14B is a flow diagram illustrating the production method for a natural-extract beverage of the present invention.

FIG. 16 is a flow diagram illustrating the production method for a natural-extract beverage of the present invention.

FIG. 17 is a flow diagram illustrating the production method for a natural-extract beverage of the present invention.

FIG. 19B is a flow diagram illustrating a production method for a natural-extract beverage using the compact and simple production device for a natural-extract beverage of the present invention.

FIG. 20A is a flow diagram illustrating an embodiment of the production method for a natural-extract beverage of the present invention.

FIG. 20B is a flow diagram illustrating an embodiment of the production method for a natural-extract beverage of the present invention.

FIG. 20C is a flow diagram illustrating an embodiment of the production method for a natural-extract beverage of the present invention.

FIG. 21A is a flow diagram illustrating an embodiment of the production method for a natural-extract beverage of the present invention.

FIG. 21B is a flow diagram illustrating an embodiment of the production method for a natural-extract beverage of the present invention.

FIG. 21C is a flow diagram illustrating an embodiment of the production method for a natural-extract beverage of the present invention.

FIG. 22A is a flow diagram illustrating an embodiment of the production method for a natural-extract beverage of the present invention.

DESCRIPTION OF EMBODIMENTS

In the present invention, it is necessary that the oxidation-reduction potential (hereinafter abbreviated as ORP) of an extract be negative. The ORP is measured using a spontaneous potential of a platinum electrode based on a silver/silver chloride reference electrode, and the spontaneous potential is an ORP value. The spontaneous potential is a potential at which the oxidation current and the reduction current in the surface of platinum balance each other. In a case of pure water, oxygen molecules are dissolved. For this reason, a reduction reaction of oxygen molecules occurs, and the spontaneous potential shifts to the positive side, and is about 200 mV. In order to shift the spontaneous potential to the negative side, a reductive substance contributing to an oxidation reaction is required.

Of various reductants, hydrogen molecules are well compatible with platinum, and a reduction reaction between the hydrogen molecules and platinum is known to easily proceed. For this reason, a hydrogen concentration is easily measured. In addition, the hydrogen molecules do not adversely affect the human body, and have an ability of scavenging reactive oxygen species in the human body. After the hydrogen molecules are used to reduce and scavenge reactive oxygen species and the like, hydrogen ions finally remain. The hydrogen ions do not adversely affect the human body. Accordingly, the hydrogen molecules are a very good and effective reductant.

In general, a concentration of dissolved molecular hydrogen in pure water of 0.01 to 0.05 ppm or more shifts the spontaneous potential from 0 mV to the negative side. In order to shift the ORP as the spontaneous potential of the extract to the negative side, it is necessary that the concentration of dissolved hydrogen in source water for extraction be 0.01 to 0.05 ppm or more. In consideration of dissolved molecular hydrogen that may be vaporized during an extraction step, it is desirable that dissolved molecular hydrogen exist in a concentration of at least 0.1 ppm or more in electrolytically reduced water that is source water for extraction.

In the present invention, it is desirable that electrolytically reduced water having a dissolved molecular hydrogen concentration of 0.1 ppm or more, or as high as possible be produced at low cost. In the present invention, it is a main object to produce an extract having high reductive performance, that is, showing negative ORP. In addition, it is desirable that the extraction performance be enhanced, and thus, an electrolytic system that achieves both the desires will be described below. In view of both reducibility and extraction performance, use of electrolytically reduced water is investigated. From the viewpoint of an electrolytic cell, the structure of the electrolytic cell and the quality of supplied water are important. From the viewpoint of extraction, water having purity as high as possible is desired.

Figure 1:
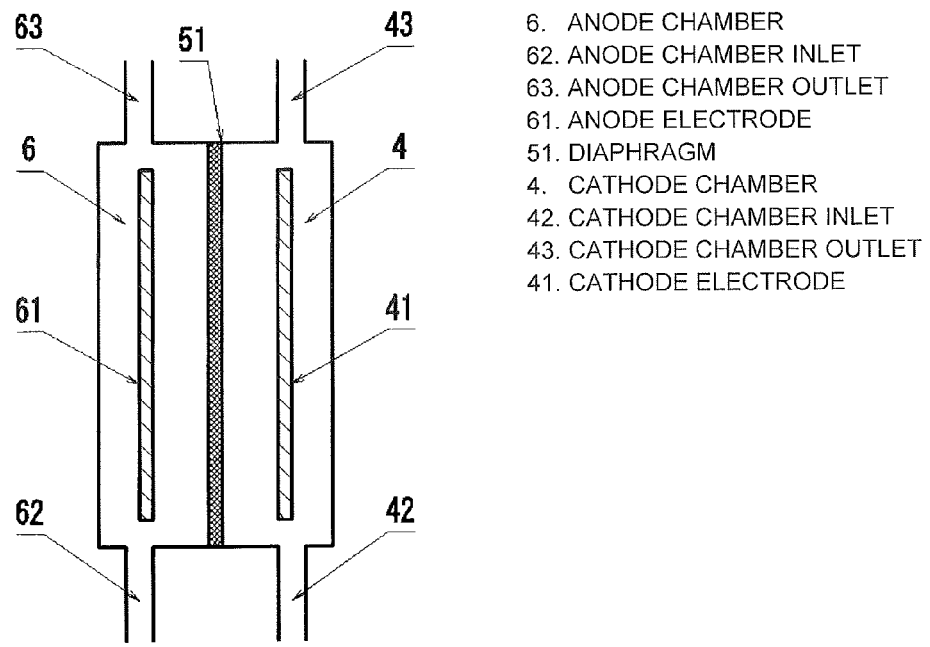
FIG. 1 is a schematic cross-sectional view illustrating a basic structure of a two-chamber electrolytic cell.
Figure 2:
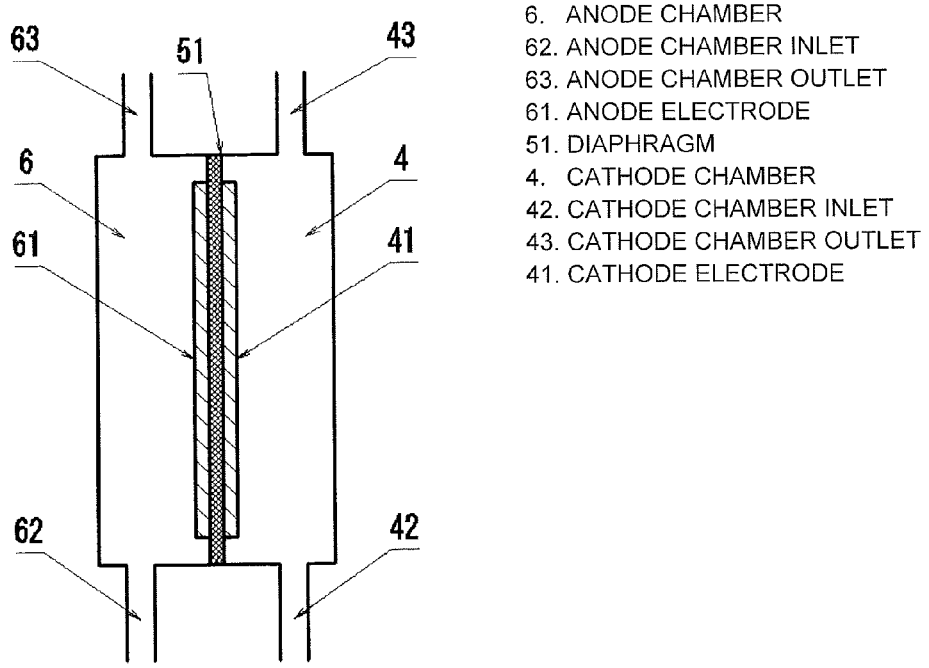
FIG. 2 is a schematic cross-sectional view illustrating a basic structure of a two-chamber electrolytic cell.

A two-chamber electrolytic cell including an anode chamber 6 and a cathode chamber 4, as shown in FIG. 1, is generally used as an electrolytic cell for production. In this electrolytic cell, a diaphragm 51 such as a porous film is disposed between an anode electrode 61 and a cathode electrode 41. Since the anode electrode 61 and the cathode electrode 41 are separated, an electrolytic solution needs to be supplied to the electrolytic cell. An electrolytic cell capable of electrolyzing high-purity water suitable for extraction, as shown in FIG. 2, is to be investigated. In the electrolytic cell of FIG. 2, a fluorine-containing cation exchange membrane is provided as the diaphragm 51, and a porous anode electrode 61 and a porous cathode electrode 41 are closely adhered to both sides of the diaphragm 51. Since movable hydrogen ions are generated in the inside of the fluorine-containing cation exchange membrane, electrolysis can be performed even in high-purity water under low voltage.

As a raw material for a natural-extract beverage used in the present invention, coffee beans or tea leaves are used. Examples of tea leaves may include green tea, black tea, and oolong tea.

In order to produce a natural-extract beverage in a reduction state in the present invention, it is necessary that volatilization of dissolved molecular hydrogen in electrolytically reduced water as an extraction solvent be suppressed. The means that suppresses the volatilization of dissolved molecular hydrogen is at least one means selected from means of using electrolytically reduced water obtained by electrolysis of heated source water, means of performing extraction under high pressure in a sealed container, and means of adding to the electrolytically reduced water at least one dissolved-hydrogen stabilizing agent selected from polysaccharides and/or polyphenols.

Method Using Electrolytically Reduced Water Obtained by Electrolysis of Heated Source Water When a time between the electrolytic cell and an extraction portion is shortened, the volatilization ratio of dissolved molecular hydrogen can be decreased. In application for general personal use other than an industrial field, the temperature of the electrolytic cell is adjusted to normal temperature that is 40° C. or lower. In order to shorten the time between electrolysis and extraction, it is desirable that source water be heated to a high temperature that is higher than temperatures suitable for extraction and electrolyzation. An electrolytic cell and an electrolytic system that can achieve these objects will be described below.

In order to perform electrolysis at temperatures as high as 60° C. or higher, a fluorine-containing resin is suitable for a diaphragm and an ion exchange resin.

Figure 12A:
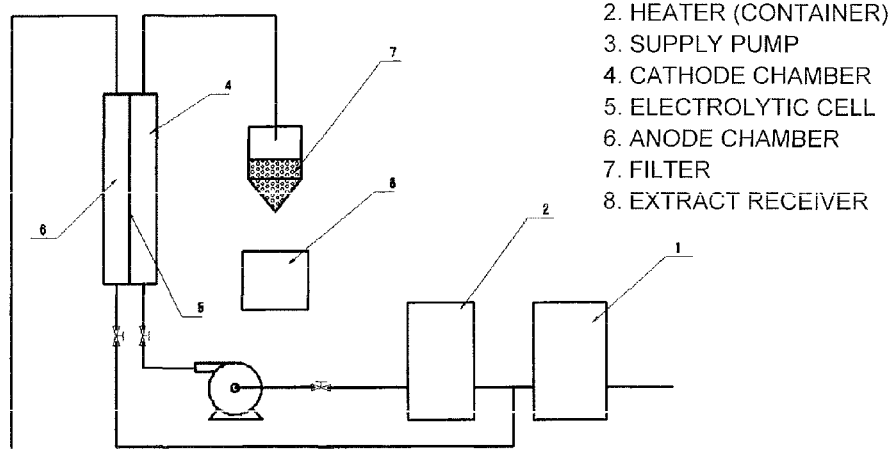
FIG. 12A is a flow diagram illustrating a production method for a natural-extract beverage of the present invention.
Figure 12B:
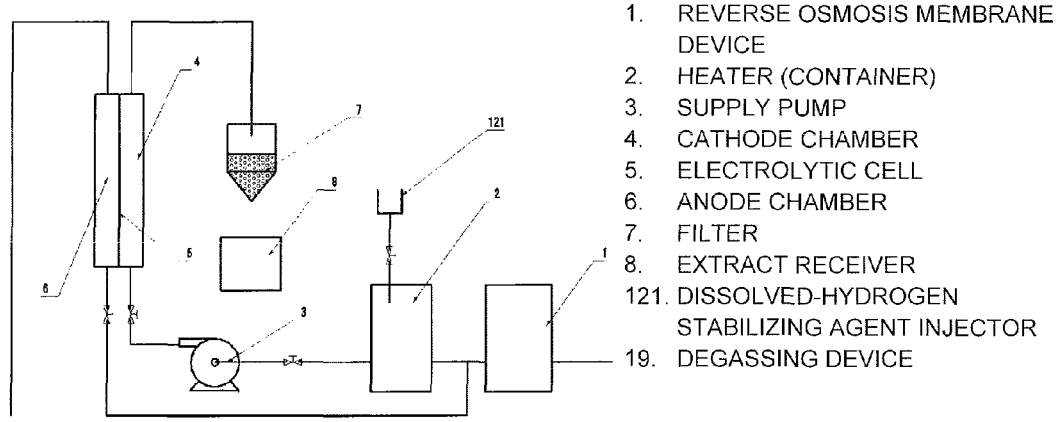
FIG. 12B is a flow diagram illustrating the production method for a natural-extract beverage of the present invention.

A time required for adjusting the temperature of liquid containing dissolved molecular hydrogen to target temperature is shortened as much as possible. As shown in FIGS. 12A, 12B, and 12C, source water is heated by a heater (container) 2, and the heated high-purity source water is electrolyzed. Thus, the time between electrolysis and extraction is shortened as much as possible.

In order to suppress the volatilization of dissolved molecular hydrogen, the time between the electrolytic cell and the extraction container needs to be shortened. Here, a process of heating source water will be described.

The solubility of gas molecules is known to decrease with increase in the temperature. When the temperature is increased during heating a solution of dissolved molecular hydrogen, hydrogen molecules vaporize in the air with heating time. When the heating time is extended, the concentration of dissolved molecular hydrogen decreases. In order to maintain or increase the concentration of dissolved molecular hydrogen by heating, the following process is conceivable.

(i) First, it is preferable that the concentration of dissolved molecular hydrogen be increased as much as possible. The concentration of dissolved molecular hydrogen in electrolytically reduced water becomes a problem during electrolytic reduction. When an electrolytic current is flown while water is fed at a constant flow rate of water, the concentration of dissolved molecular hydrogen is desirably higher.

Figure 5:
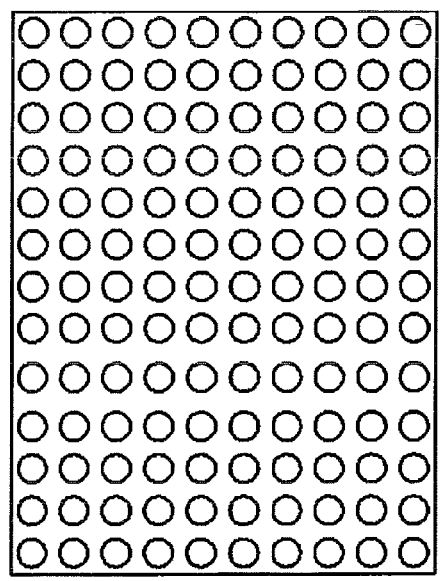
FIG. 5 is a view illustrating a porous electrode.

In order to increase the concentration of dissolved molecular hydrogen, a space between a diaphragm 52 and the cathode electrode 41 is filled with an ion exchange resin 10 and the porous anode electrode 61 as shown in FIG. 5 is closely adhered to the diaphragm 52, as shown in FIG. 3A. In general, a titanium plate is used as a substrate of an electrode. The surface of the plate is plated with noble metal such as platinum, or noble metal such as platinum is deposited or vapor-deposited on the surface. In the two-chamber electrolytic cell of FIG. 2, water is allowed to pass through the back side of the cathode electrode 41. In this case, hydrogen molecules are produced at a space between the porous cathode electrode 41 and the diaphragm 51. The hydrogen molecules assemble, transfer to the back side through pores of the cathode electrode, and are dissolved in a bubble state in passing water.

When the electrolytic cell of FIG. 3A is used to pass water along the front face of the cathode electrode, the concentration of dissolved molecular hydrogen can be increased. Hydrogen molecules in the front face of the cathode electrode are dissolved in a fine bubble state in passing water. The electrolytic cell of FIG. 3A is suitable for increase in the concentration of dissolved molecular hydrogen. A process of passing water through an electrolytic face of the cathode electrode, as described above, is the following process.

Figure 7:
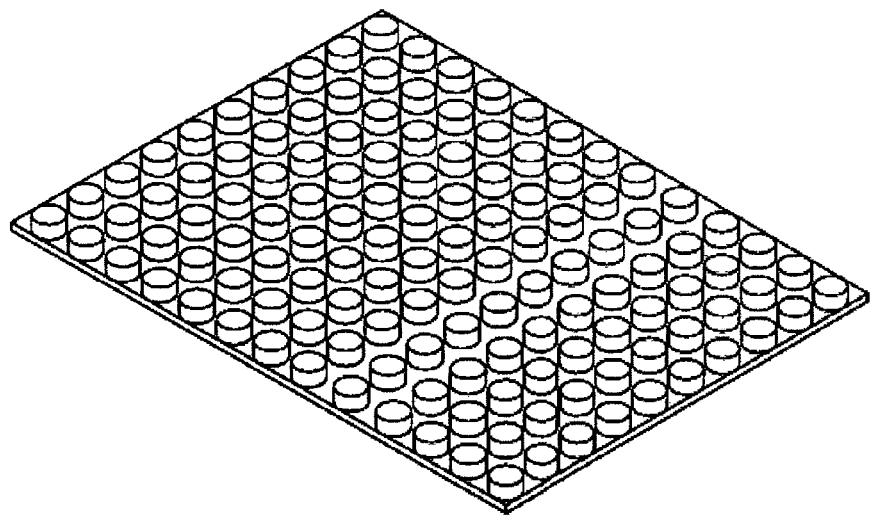
FIG. 7 is a view illustrating an embodiment of a cathode electrode.

(i-i) As shown in FIG. 7, a protruding structure is formed on an electrode face of the cathode. In FIG. 7, a column protrusion is mounted on an electrolytic face of the cathode electrode. Water is allowed to pass between the diaphragm and the column protrusion. The protrusion has a diameter φ of about 10 mm and a height of 3 to 5 mm.

Figure 8:
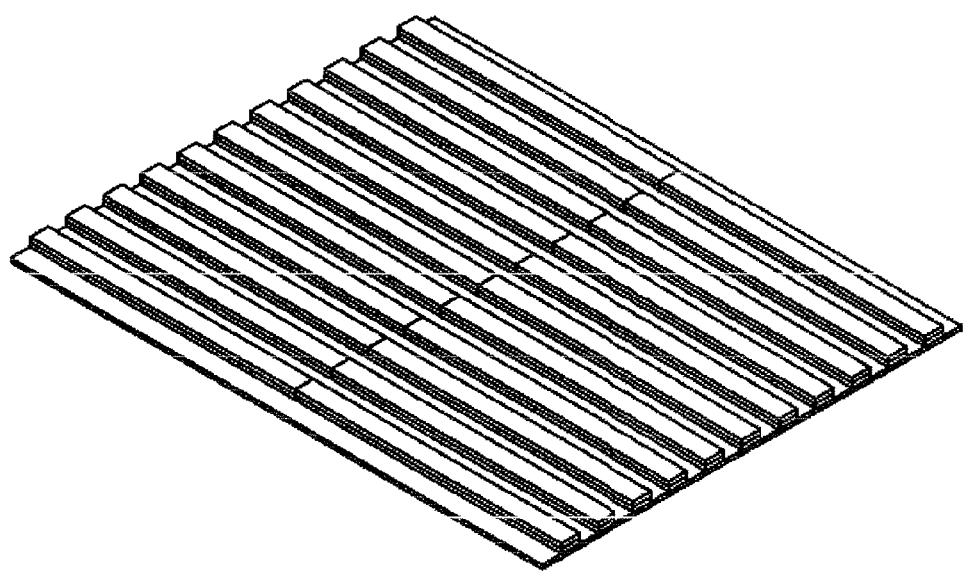
FIG. 8 is a view illustrating an embodiment of a cathode electrode.

(i-ii) As shown in FIG. 8, a groove structure is formed on the electrolytic face of the cathode electrode. Water is allowed to pass through a concave portion of the groove. The groove has a width of 5 to 15 mm and a height of 3 to 5 mm.

Figure 9:
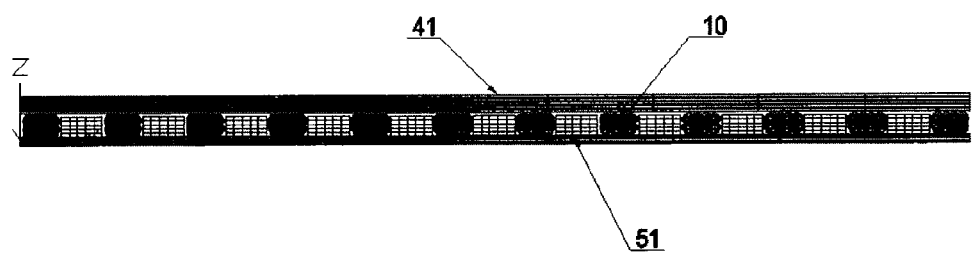
FIG. 9 is a schematic cross-sectional view illustrating an embodiment of the cathode electrode.

(i-iii) When high-purity source water is used, the concave portion of the groove is filled with the ion exchange resin 10, as shown in FIG. 9. Thus, the electrolytic resistance can be decreased in the concave portion that causes electrolysis on the whole face of the electrode, as shown in FIGS. 7 and 8, and the electrolytic efficiency is improved. As the ion exchange resin, the fluorine-containing cation exchange membrane is excellent in terms of heat resistance.

(ii) In order to further increase the concentration of dissolved molecular hydrogen, there is a method of degassing gas other than hydrogen molecules contained in source water, for example, oxygen gas in advance.

This degassing can substantially increase the solubility of hydrogen molecules. Examples of a degassing method may include degassing by heating, degassing under reduced pressure, an ultrasonic wave method, and a helium or nitrogen gas-stirring method. Of the methods, the helium or nitrogen gas-stirring method does not satisfy the purpose of increasing the concentration of dissolved molecular hydrogen. Therefore, the degassing by heating, the degassing under reduced pressure, and the ultrasonic wave degassing method are preferred. In the degassing by heating, the degassing effect is higher at higher temperatures. Therefore, source water is degassed at higher temperatures by a heating portion of a degassing system, and the temperature of the source water in an electrolytic cell portion is decreased. The degassing under reduced pressure is degassing in vacuum, and may be a method using a hollow fiber filter.

The main object of the present invention is to enhance the reducibility of the extract, that is, make the ORP more negative to extend the life span. For this reason, an extraction system needs to be improved. An improvement method is as follows.

In addition to electrolysis of source water of higher temperature, electrolysis of the extract itself performed at high temperature can make the ORP of the extract negative.

As shown in FIG. 13, an extract obtained by extraction from a raw material for coffee or the like is further electrolyzed to decrease the ORP, enhancing the reducibility.

Figure 14C:
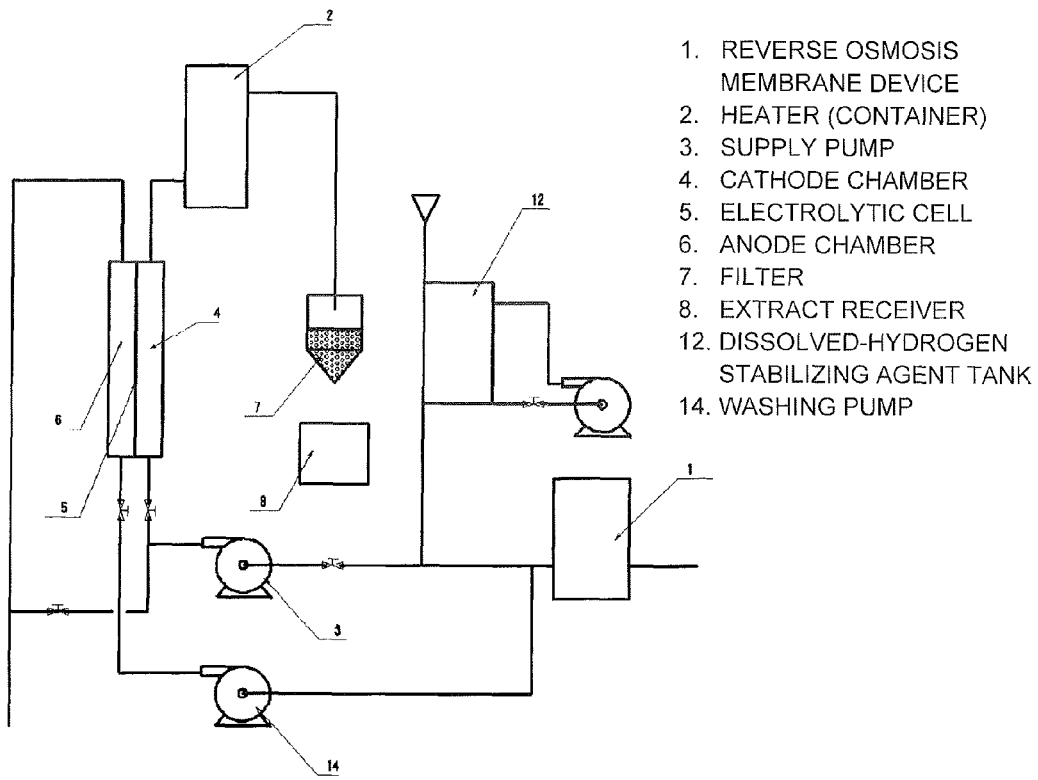
FIG. 14C is a flow diagram illustrating the production method for a natural-extract beverage of the present invention.

In electrolysis of the extract, the electrode may be contaminated by an extraction component to increase the electrolytic resistance. In order to appropriately remove this contamination, it is desirable that a pump 14 of supplying washing liquid be incorporated, as shown in FIG. 14C, and the electrolytic cell be washed.

Figure 4B:
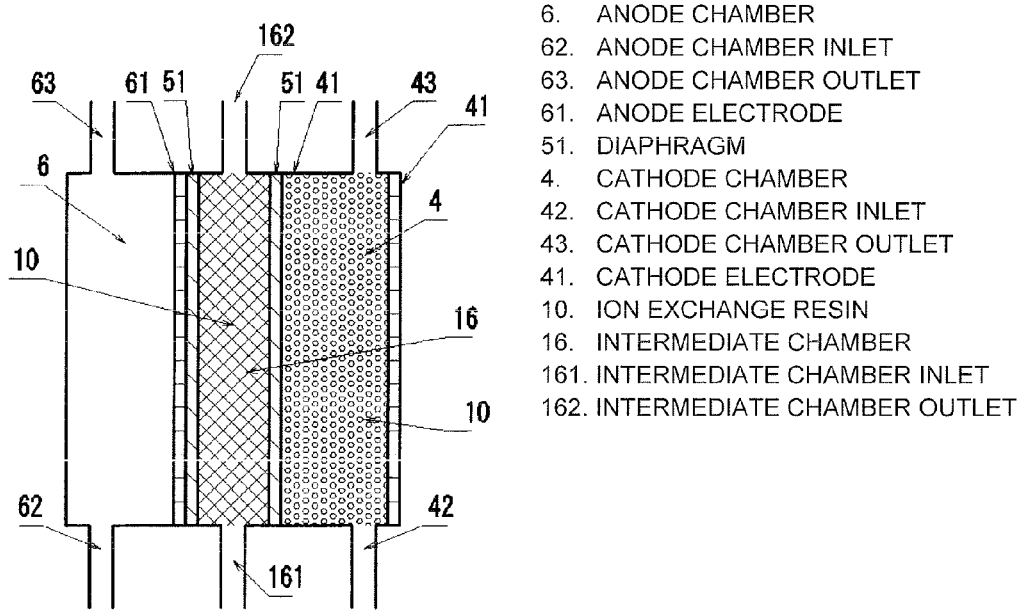
FIG. 4B is a schematic cross-sectional view illustrating a structure of an embodiment of the three-chamber electrolytic cell.

In order to cause dissolved molecular hydrogen to be contained in source water, there is a method in which a three-chamber electrolytic cell that has an intermediate chamber between the anode chamber and the cathode chamber is used. Specifically, as shown in FIGS. 4A and 4B, there is a three-chamber electrolytic cell that has an intermediate chamber between the anode chamber 6 and the cathode chamber 4. In the three-chamber electrolytic cell shown in FIG. 4A, each chamber is separated by a fluorine-containing cation exchange membrane 51. The anode electrode 61 and the cathode electrode 41 are closely adhered to the fluorine-containing cation exchange membrane 51 as the diaphragm. In the three-chamber electrolytic cell shown in FIG. 4B, the porous anode electrode is closely adhered to the diaphragm between the anode chamber and the intermediate chamber. A space between the diaphragm, interposed between the cathode chamber and the intermediate chamber, and the cathode electrode is filled with an ion exchange resin. The space is filled with a cation exchange resin or an anion exchange resin as the ion exchange resin. A dissolved-hydrogen stabilizing agent may be added to a solution that is poured into the intermediate chamber of the three-chamber electrolytic cell.

Figure 22B:
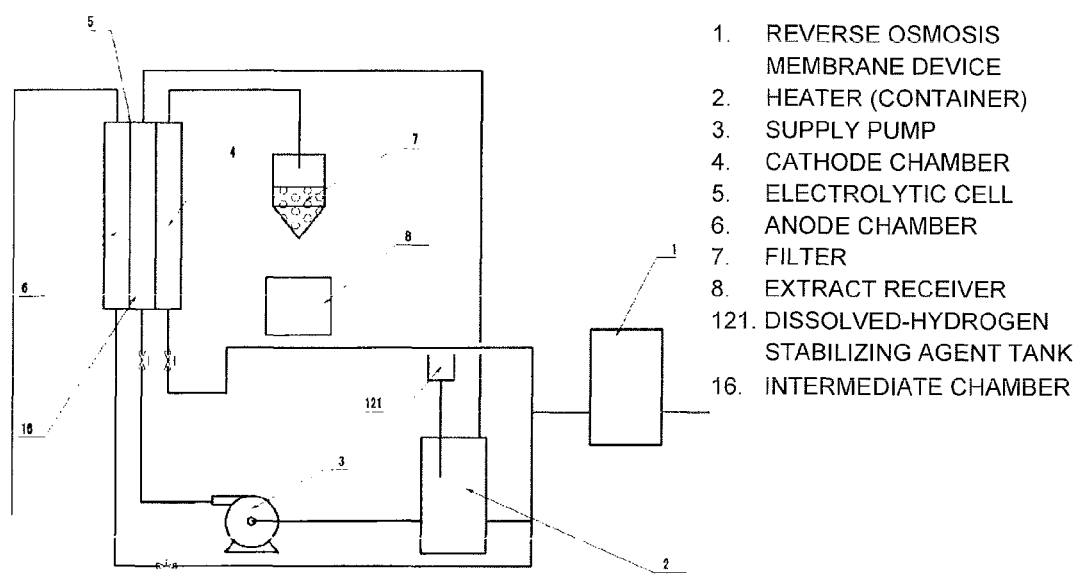
FIG. 22B is a flow diagram illustrating an embodiment of the production method for a natural-extract beverage of the present invention.

FIGS. 20A, 20B, and 20C show a system for producing a natural-extract beverage that is provided with an electrolytic cell circulation line to increase the concentration of dissolved molecular hydrogen. FIGS. 22A and 22B show a system for producing a natural-extract beverage using the three-chamber electrolytic cell. As shown in FIG. 20A, tap water is purified by a reverse osmosis membrane treatment device 1 using a reverse osmosis membrane filter, and the purified water is supplied to the cathode chamber 4 in an electrolytic cell 5, electrolyzed at the cathode under heating between the cathode chamber 4 and the heater (container) 2, and circulated to increase the concentration of dissolved molecular hydrogen. A natural raw material such as coffee beans is subjected to extraction using heated electrolytically reduced water having increased concentration of dissolved molecular hydrogen to produce an extract, and the extract is collected in the extract receiver 8. In this system, the heater (container) 2 is provided with a dissolved-hydrogen stabilizing agent injector 121, and thus the concentration of dissolved molecular hydrogen can be further increased under heating.

In FIG. 20B, source water heated by the heater (container) 2 is circulated in the cathode chamber 4 in the electrolytic cell 5. This can increase the concentration of dissolved molecular hydrogen. A natural raw material such as coffee beans is subjected to extraction using source water having this concentration of dissolved molecular hydrogen to produce an extract, and the extract is supplied to the cathode chamber 4 in the electrolytic cell 5 to shift the ORP of the extract to the negative side.

FIG. 20C is the system flow of FIG. 20B to which a filter 34 for increase in the concentration of dissolved molecular hydrogen such as ion exchange resin or zeolite is added on the circulation line. The ORP of the extract is thereby further shifted to the negative side.

In FIG. 22A, tap water is treated with a reverse osmosis membrane filter 1 to purify source water. After the purification, the source water is heated by the heater (container) 2, and then supplied to the cathode chamber 4 and an intermediate chamber 16 in the electrolytic cell 5. The heated water electrolyzed at the cathode is supplied to an extraction filter 7 from coffee beans, and the extract is collected in the extract receiver 8.

In FIG. 22B, tap water is purified by the reverse osmosis membrane filter 1, and the source water is heated by the heater (container) 2. The heated source water is first supplied to the intermediate chamber 16 in the electrolytic cell 5. The source water is returned to the heater (container) 2 and finally supplied to the cathode chamber 4. This increases the concentration of dissolved molecular hydrogen. If necessary, the dissolved-hydrogen stabilizing agent is added using the dissolved-hydrogen stabilizing agent injector, to increase the concentration of dissolved molecular hydrogen. This water electrolyzed at the cathode is supplied to the filter 7 filled with a natural raw material such as coffee beans, and subjected to extraction. The extract is then received by the extract receiver 8.

(2) Means of Extraction in Sealed Container

When an extract solution from a natural product, such as coffee, is produced using electrolytically reduced water, is means of extraction using a sealed pressure-resistant heat-resistant container that can prevent the volatilization of dissolved molecular hydrogen is exemplified as means of preventing volatilization of dissolved molecular hydrogen.

Further, electrolytically reduced water is produced, and supplied to the filter and the extract receiver. After that, a supply line is closed by a valve and an extract sampling line is closed by a valve. Thus, the volatilization of dissolved molecular hydrogen is prevented during extraction.

Figure 18:
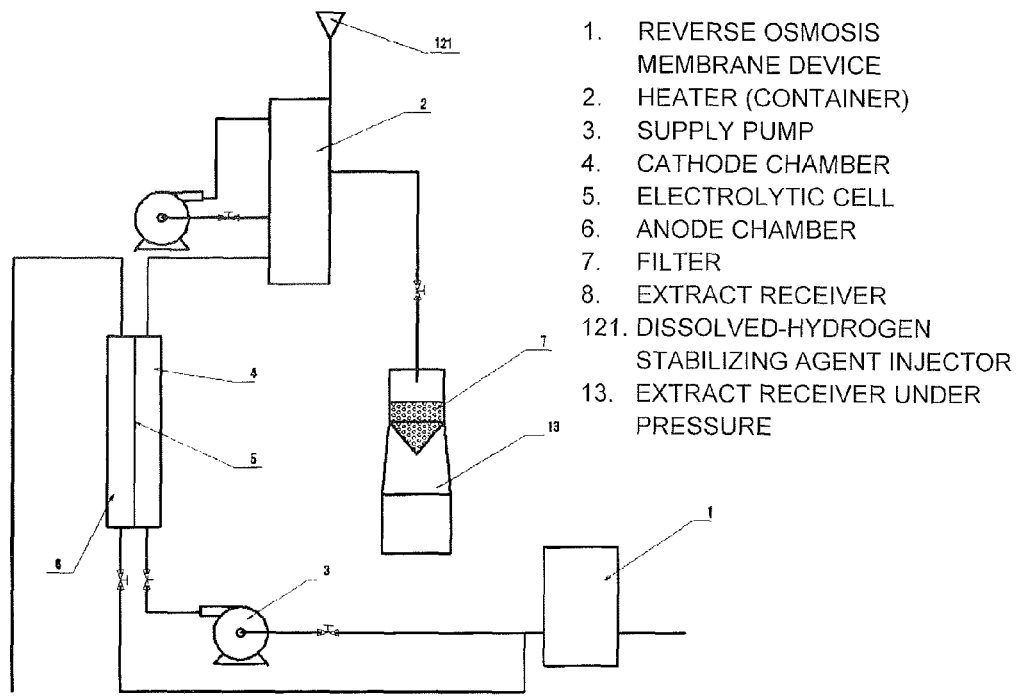
FIG. 18 is a flow diagram illustrating the production method for a natural-extract beverage of the present invention.

As shown in FIGS. 16, 17, and 18, there is a system of preventing the volatilization of dissolved molecular hydrogen. In the system, the filter 7 for extraction from a raw material of coffee or the like by dripping is sealed and the extract is collected in an extract receiver 13 having a sealed structure under pressure.

(3) Means of Adding Dissolved-Hydrogen Stabilizing Agent

There is a method of adding the dissolved-hydrogen stabilizing agent to electrolytically reduced water used in extraction from a natural raw material for coffee or the like to suppress the volatilization of dissolved hydrogen.

As the dissolved-hydrogen stabilizing agent, a saccharide and/or a polyphenol is used.

A saccharide is at least one kind selected from the group consisting of monosaccharides, disaccharides, oligosaccharides, polysaccharides, and sugar alcohols.

Examples of the saccharides may include glucose, fructose, mannose, xylose, galactose, and ribose. Examples of the disaccharides may include maltose, lactose, cellobiose, and fructose. Examples of the oligosaccharides may include an oligosaccharide.

Examples of the polysaccharides may include chitin, chitosan, starch, glycogen, cellulose, carrageenan, pectin, xyloglucan, serratine, hyaluronic acid, alginic acid, and dietary fiber.

Figure 6:
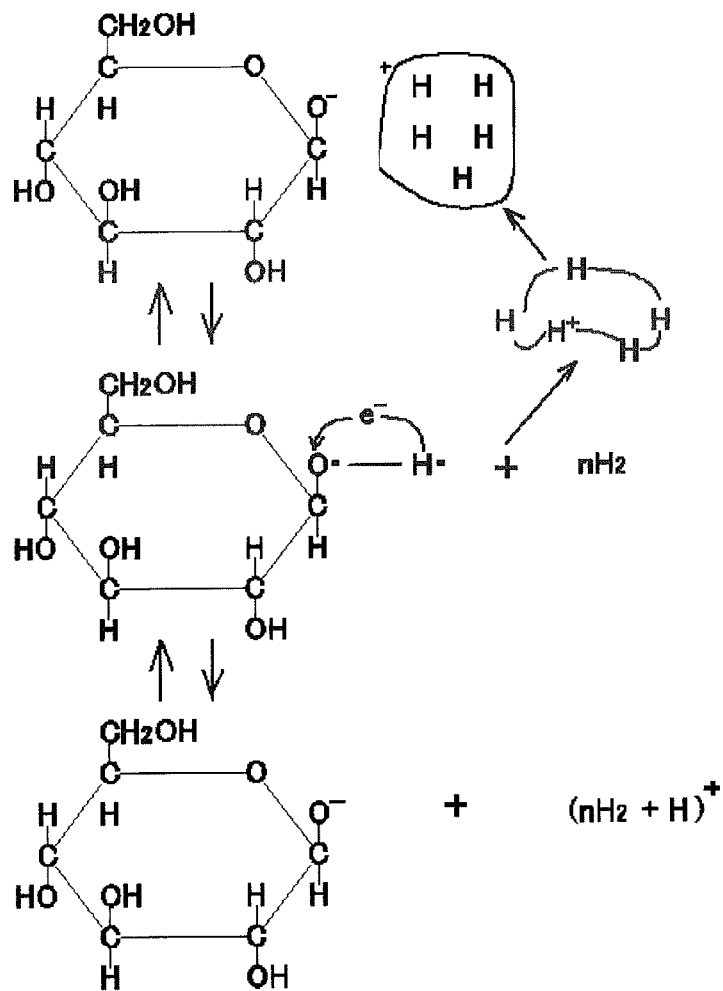
FIG. 6 is a view illustrating a stabilization mechanism of dissolved molecular hydrogen.

In an aldehyde group (CHO group) or a glycosidic hydroxyl group (OH group) of such a substance, a hydrogen atom bonded to oxygen is likely to be dissociated, that is, the groups have an ability of donating a hydrogen atom. Reducibility will be described with reference to a case of α-glucose in FIG. 6. It is conceivable that a hydrogen atom in a glycosidic hydroxyl group of α-glucose is dissociated to form a complex with dissolved molecular hydrogen. Electrons are transferred from the hydrogen atom to α-glucose, and hydrogen ions then form a complex with a hydrogen molecule. The hydrogen molecules have a charge by interaction with α-glucose, and the presence time of the hydrogen molecules in water can be extended.

The dissolved-hydrogen stabilizing agent interacts with dissolved molecular hydrogen, and is useful in extension of the life span of the concentration thereof. In the present invention, the dissolved molecular hydrogen is stabilized in water due to the interaction, and the volatilization ratio decreases due to heating. When the dissolved-hydrogen stabilizing agent including the saccharide and/or polyphenol is added before or after the electrolytic cell, the life span of the concentration of dissolved molecular hydrogen in a heated solution is extended. As a result, the ORP of the extract is further shifted to the negative side.

As shown in FIGS. 14A, 14B, and 14C, the dissolved-hydrogen stabilizing agent is added to a component of the coffee raw material or the like. Thus, the reducibility of the extract can be enhanced, and the life span of the dissolved molecular hydrogen can be extended.

FIG. 17 shows a system in which heated source water, to which the dissolved-hydrogen stabilizing agent has been added, is electrolyzed, and extraction from a raw material for coffee is performed in a sealed state.

The system has such a structure that the dissolved-hydrogen stabilizing agent is added to the heater (container) 2 using the injector 121 and source water is heated. The resulting source water is supplied to the cathode chamber 4 in the electrolytic cell 5, reduced by electrolysis at the cathode, and subjected to extraction by the filter 7 filled with coffee beans. The extract is collected in the extract receiver 13 under pressure without volatilization of hydrogen molecules.

FIG. 18 shows a system in which the hydrogen stabilizing agent is added to electrolytic water and extraction from a raw material for coffee is performed by heating.

Water purified by the reverse osmosis membrane filter 1 is reduced at the cathode of the cathode chamber 4 in the electrolytic cell 5. The electrolytically reduced water is heated by the heater (container) 2, and at the same time, the dissolved-hydrogen stabilizing agent is added using the dissolved-hydrogen stabilizing agent injector 121.

Figure 19A:
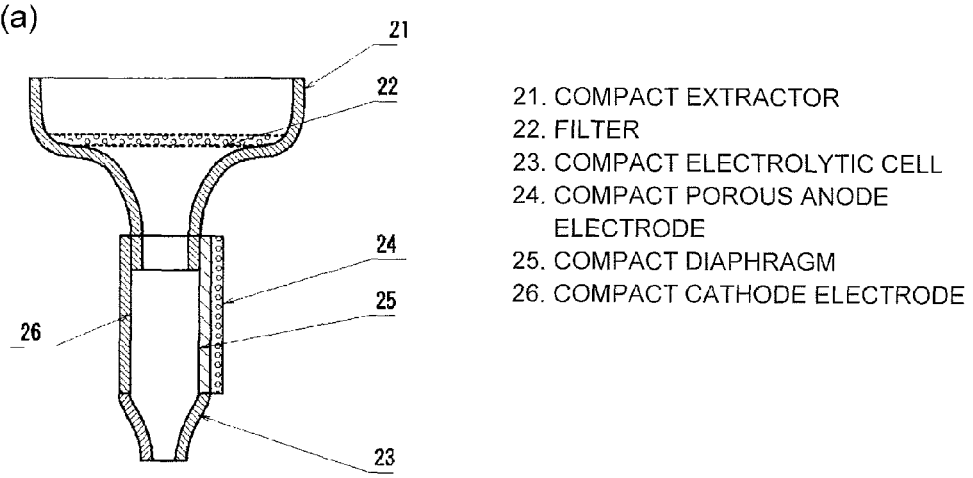
FIG. 19A is a schematic cross-sectional view illustrating a compact and simple production device for a natural-extract beverage of the present invention.

Examples of a compact device of producing a natural-extract beverage include devices shown in FIGS. 19A and 19B.

FIG. 19A shows a device in which the extract is directly electrolyzed. As shown in FIG. 19B, there is an electrolytic cell-heating container 31 in which the dissolved-hydrogen stabilizing agent injector 121 and a compact heater 32 are incorporated.

A compact extract electrolytic system is shown in FIG. 19A. A filter 22 is incorporated in a compact extractor 21. A natural raw material such as coffee beans is placed on the filter, and heated water is poured. A compact electrolytic cell 23 is connected to the outlet of the compact extractor 21. A body of the compact electrolytic cell is used as a compact cathode electrode 26, and a compact diaphragm 25 and a compact porous anode electrode 24 are closely adhered to a part of the compact cathode electrode 26. In the compact electrolytic cell 23, a heated extract is electrolyzed at the cathode, and the ORP of the extract is shifted to the negative side.

As shown in FIG. 19B, an electrode portion in which the compact porous anode electrode and a compact porous cathode electrode 27 are closely adhered to the compact diaphragm 25 is incorporated in the compact electrolytic cell-heating container 31. The system has such a structure that the compact heater can be incorporated in the cathode chamber in the electrolytic cell-heating container 31 and the dissolved-hydrogen stabilizing agent injector can be attached. Source water is supplied to the cathode chamber and heated, the filter is filled with coffee beans, and extraction is then performed. The extract is collected in an electrolyzed extract receiver 8.

FIG. 21 shows a system of automatically supplying a natural extract. The dissolved-hydrogen stabilizing agent is added to source water by utilizing a dissolved-hydrogen stabilizing agent-adding tank 12, and the resulting source water is supplied to the cathode chamber 4 in the electrolytic cell 5, to produce electrolytically reduced water. The electrolytically reduced water is then heated by the heater (container) 2, and transferred to the filter 7. From coffee beans or the like in the filter, the extract is produced. A device of automatically supplying coffee beans or the like to an electrolysis extraction device is incorporated. This is because automatic supply of coffee beans or the like is expected, when this system is commercialized.

The systems may be combined to form a system of enhancing reducibility (shifting the ORP to the negative side more) and producing a coffee extract.

Example 1 (Extraction System of Heating Electrolytic Solution)

Figure 11:
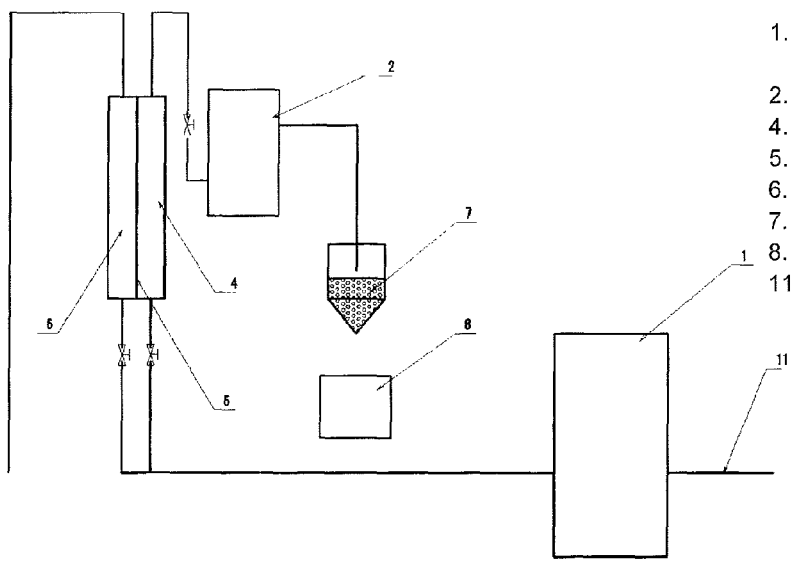
FIG. 11 is a flow diagram of a conventional production device for a coffee beverage using electrolytically reduced water.

A conventional method using an electrolysis extraction system shown in FIG. 11 has a defect in which dissolved molecular hydrogen vaporizes in a heating tank to decrease the concentration since an electrolytic water is subjected to heat for extraction.

As shown in FIG. 13, it is arranged before an electrolytic cell, and hot water at 70 to 90° C. is electrolyzed at a cathode to increase the concentration of dissolved molecular hydrogen. An aqueous solution having a high concentration of dissolved molecular hydrogen is produced at high temperature, and extraction from a coffee raw material is performed. Through this process, a coffee extract is produced. In the used electrolytic cell shown in FIG. 2, a fluorine-containing cation exchange membrane was used as a diaphragm to withstand high temperature. A platinum-plated porous electrode having an electrode area of 4×5 $cm^2$ is used. Water was supplied at a flow rate of 0.5 L/min. A space between the diaphragm and a cathode electrode is filled with an ion exchange resin, as shown in FIG. 3A. Thus, the concentration of dissolved molecular hydrogen can be increased. Use of this electrolytic cell can shift the ORP of the extract to the negative side. Further, use of the electrolytic cell of FIG. 3A, 3B, or 3C can enhance the reducibility of the extract. Since heated water is electrolyzed, a fluorine-containing cation exchange membrane is used as the diaphragm, and a fluorine-containing cation exchange resin is used as the ion exchange resin to be filled in.

As a raw material for coffee, regular coffee powder obtained from coffee beans named as "Brazil" and those grown in Brazil was used as a sample. 150 mL of produced water was dripped to 15 g of coffee powder to extract a coffee beverage.

Figure 10:
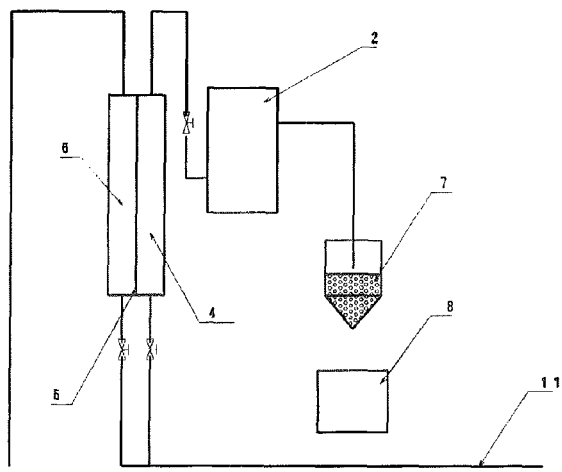
FIG. 10 is a flow diagram of a conventional production device for a coffee beverage using electrolytically reduced water.

For comparison, the ORP of a liquid extracted under various conditions using a conventional basic extraction system shown in FIG. 10 was measured. The results are shown in Table 1. Table summarizes the used extraction system, the structure of electrolytic cell, current, ORP, heating, the presence or absence of degassing, and the supplied water quality, temperature, and flow rate of supplied water. When tap water was subjected to extraction without electrolysis, the ORP was about +150 mV, which is substantially the same as the ORP of usual water. When the temperature of the extract was increased, the ORP was slightly shifted to the negative side due to an extraction component, and was about +30 mV. When the electrolytic water was heated, the ORP of the extract was about −5 mV. The porous electrode of FIG. 5 was used in the electrolytic cell of FIG. 2. Heated water was electrolyzed as shown in the system of FIG. 12A. The ORP of the extract was about −50 mV. FIG. 5 shows an example in which the area was 4×5 $cm^2$ and pores had a diameter $\phi$ of 5 mm. As shown in the system of FIG. 12A, heated water was electrolyzed using the electrolytic cell of FIGS. 2 and 5. The ORP of the extract was about −95 mV. In order to confirm an effect of degassing, effects of degassing by heating and degassing in vacuum were compared using the electrolytic cell of FIG. 3A. In the degassing by heating, source water was heated at 80 to 90° C. for 20 minutes by a 2-L heater (container), resulting in degassing, and then cooled at about 0° C., and supplied to the electrolytic cell of FIG. 3A. As a result, the ORP of the extract was further shifted to the negative side, or −135 mV. Further, dissolved gas in source water was decreased by about 60% in terms of concentration of dissolved oxygen using a vacuum degassing device, and the source water was supplied to the electrolytic cell of FIG. 3A. As a result, the ORP of the extract was further shifted to the negative side, or −155 mV. Thus, the effects of degassing are confirmed.

In FIG. 12C, tap water is purified by the reverse osmosis membrane filter 1 to obtain source water, and the source water is heated by the heater (container) 2, and supplied to the cathode chamber 4 in the electrolytic cell 5. Extraction from coffee beans is performed in the filter 7 using heated electrolytic water. The extract is received by the extract receiver 8. The dissolved-hydrogen stabilizing agent injector 121 or a degassing device 19 is incorporated in the heater (container). The degassing device 19 is connected to a vacuum pump, and has a structure in which the air pressure in the heater (container) 2 can be maintained to a pressure equal to or lower than the atmospheric pressure.

The electrolytic cell of FIG. 3C is an electrolytic cell having an electrode of FIG. 9 in which the cathode electrode of FIG. 8 is filled with an ion exchange resin.

Next, effects of the electrolytic cell of FIG. 3A and effects the electrolytic cells of FIGS. 3B and 3C are compared using FIG. 12C showing a vacuum-degassing electrolysis extraction system. When the electrolytic cell of FIG. 3A was used, the ORP was −155 mV. When the electrolytic cell of FIG. 3B was used, the ORP was −240 mV, and was shifted to more negative. When the electrolytic cell of FIG. 3C was used, the ORP was −245. As described above, when the groove-electrode is used, the electrolytic effect increases.

TABLE 1

RELATIONSHIP BETWEEN ELECTROLYSIS EXTRACTION SYSTEM, STRUCTURE OF ELECTROLYTIC CELL, TEMPERATURE, PRESENCE OR ABSENCE OF DEGASSING, AND ORP

| | ELECTROLYTIC CELL | | | | SOURCE WATER SUPPLIED TO ELECTROLYTIC CELL | | FLOW | EXTRACT |
|---|---|---|---|---|---|---|---|---|
| SYSTEM | STRUCTURE | CURRENT (A) | ORP (mV) | HEATING | WATER QUALITY | TEMPERATURE (° C.) | RATE (l/min) | TEMPERATURE (° C.) |
| FIG. 10 | FIG. 2 | 0 | ~+150 | AFTER ELECTROLYTIC CELL | TAP WATER | NORMAL TEMPERATURE | 0.5 | NORMAL TEMPERATURE |
| FIG. 11 | FIG. 2, FIG. 5 | 0 | ~+30 | AFTER ELECTROLYTIC CELL | TAP WATER | NORMAL TEMPERATURE | 0.5 | 70~90 |
| FIG. 11 | FIG. 2, FIG. 5 | 6 | ~−5 | AFTER ELECTROLYTIC CELL | TAP WATER | NORMAL TEMPERATURE | 0.5 | 70~90 |
| FIG. 12(a) | FIG. 2, FIG. 5 | 6 | ~−50 | BEFORE ELECTROLYTIC CELL | RO-TREATED WATER | 70~90 | 0.5 | 70~90 |
| FIG. 12(a) | FIG. 3(a) | 6 | ~−95 | BEFORE ELECTROLYTIC CELL | RO-TREATED WATER | 70~90 | 0.5 | 70~90 |
| FIG. 12(b) | FIG. 3(a) | 6 | ~−135 | BEFORE ELECTROLYTIC CELL | RO-TREATED WATER BY DEGASSING BY HEATING | 80~90 | 0.5 | 70~80 |
| FIG. 12(c) | FIG. 3(a) | 6 | ~−155 | BEFORE ELECTROLYTIC CELL | RO-TREATED WATER BY DEGASSING IN VACUUM | 70~90 | 0.5 | 70~90 |
| FIG. 12(b) | FIG. 3(b) | 6 | ~−210 | BEFORE ELECTROLYTIC CELL | RO-TREATED WATER | 70~90 | 0.5 | 70~90 |
| FIG. 12(c) | FIG. 3(b) | 6 | ~−240 | BEFORE ELECTROLYTIC CELL | RO-TREATED WATER BY DEGASSING BY HEATING | 80~90 | 0.5 | 70~80 |
| FIG. 12(b) | FIG. 3(c) | 6 | ~−245 | BEFORE ELECTROLYTIC CELL | RO-TREATED WATER | 70~90 | 0.5 | 70~90 |
| FIG. 12(c) | FIG. 3(c) | 6 | ~−260 | BEFORE ELECTROLYTIC CELL | RO-TREATED WATER BY DEGASSING IN VACUUM | 70~90 | 0.5 | 70~90 |

Example 2 (Electrolysis of Extract)

In order to shift the ORP of electrolytic extract to a more negative side, a hydrogen molecule-stabilizing component such as polyphenol in the extract may be used. As shown in Table below, a coffee raw material contains a component that may highly interact with dissolved molecular hydrogen. The component is used to shift the ORP of the extract to the more negative side.

TABLE 2

RATIO OF COMPONENT IN RAW MATERIAL FOR COFFEE

| COMPONENT | | RATIO (%) |
|---|---|---|
| ALL POLYSACCHARIDES | | 21.0~39.0 |
| OLIGOSACCHARIDE | | 0~3.5 |
| LIPID | | 14.5~20.0 |
| FREE AMINO ACID | | 0 |
| PROTEIN | | 13.0~15.0 |
| ALL CHLOROGENIC ACIDS | POLYPHENOL | 1.2~1.3 |
| CAFFEINE | | ~1.0 |
| TRIGONELLINE | | 0.5~1.0 |
| ALIPHATIC ACID | | 1.0~1.5 |
| INORGANIC COMPONENT | | 3.5~4.5 |
| CORROSIVE ACID | | 16.0~17.0 |

FIG. 13 shows a system of further electrolyzing an extract of a coffee raw material.

Tap water is purified by the reverse osmosis membrane filter 1, and heated by the heater (container) 2 at a temperature range of 70 to 90° C. to produce an extract from coffee beans. The produced heated extract is supplied to the cathode chamber in the electrolytic cell 5 through a supply pump 3. The heated extract is directly electrolyzed to obtain an extract having a negative ORP.

The extract was electrolyzed at the cathode using the electrolytic cell of FIG. 3A, 3B, or 3C that is provided with the electrode of FIG. 5, 7, 8, or 9. As the raw material for coffee, ground coffee powder obtained from coffee beans grown in Brazil was used as a sample. 600 mL of produced water was dripped to 60 g of coffee powder to extract coffee beverage.

The results are summarized in Table 3. Due to electrolysis of the extract, the electrode may be contaminated with an extraction component. Even when this contamination occurs, the electrode of FIG. 7, 8, or 9 is used to maintain electrolysis. The electrode of FIG. 7 had an electrolytic face to which a column protrusion having a diameter ϕ of 6 mm and a height of 5 mm was attached. The electrode of FIG. 8 had a groove protrusion having a height of 5 mm and a width of 5 mm attached thereto. In the electrode of FIG. 9, a space between the groove and the diaphragm was filled with a fluorine-containing ion exchange resin. By filling the space with the ion exchange resin, a time of holding the extraction component in the electrode can be extended. An efficiency of shifting the ORP to a negative value by electrolysis at the cathode can thereby be improved.

When the extract is electrolyzed at the cathode, the ORP of the electrolytic solution is shifted to the more negative side. When the electrolytic cell of FIG. 2 and the porous electrode of FIG. 5 were used, the ORP was about −250 mV.

When the electrolytic cell of FIG. 3 was used, the ORP was about −300 mV, and a liquid having higher reducibility could be produced. When the electrolytic cell of FIG. 2 provided with the electrode of FIG. 7 was used, the ORP was about −260 mV. When the electrolytic cell of FIG. 2 provided with the electrode of FIG. 8 was used, the ORP was about −270 mV. When the electrolytic cell of FIG. 2 provided with the electrode of FIG. 9 of which the groove portion was filled with a fluorine-containing cation exchange resin was used, the ORP was about −330 mV, and the electrolytic efficiency was improved.

centration increases, the reducibility of the extract increases. In Table, 500 ppm of soluble dietary fibers was added.

Figure 15:
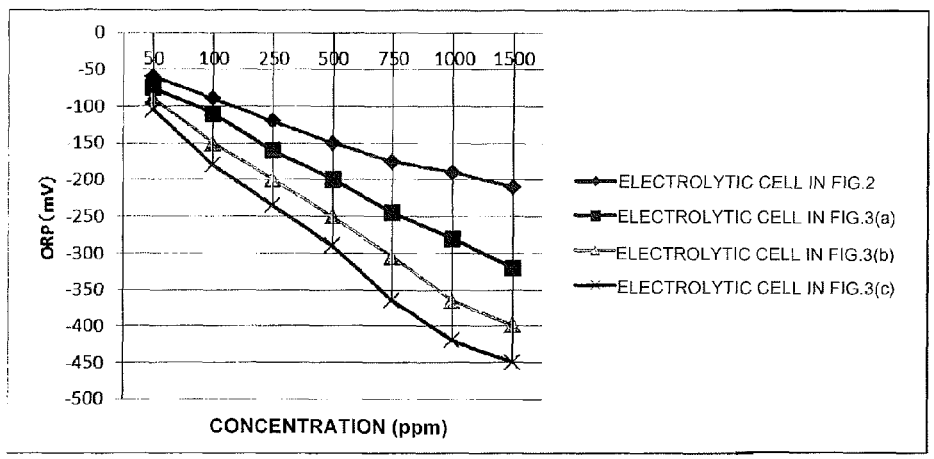
FIG. 15 is a graph showing a relationship between the addition amount of dissolved-hydrogen stabilizing agent and the structure of an electrolytic cell.

FIG. 15 is a graph showing a relationship between the structure of the electrolytic cell and the addition amount of dissolved-hydrogen stabilizing agent. As shown from the graph of FIG. 15, this relationship also depends on the structure of the electrolytic cell. The electrolytic cell of FIG. 3A, 3B, or 3C is more effective in achievement of higher reducibility of the extract than a combined electrolytic cell

TABLE 3

ORP VALUE OBTAINED BY ELECTROLYSIS OF COFFEE EXTRACT

| | ELECTROLYTIC CELL | | | | WATER SUPPLIED TO ELECTROLYTIC CELL | | | EXTRACT WATER |
|---|---|---|---|---|---|---|---|---|
| SYSTEM | STRUCTURE | CURRENT (A) | ORP (mV) | HEATING | WATER QUALITY | TEMPERATURE (° C.) | FLOW RATE (l/min) | TEMPERATURE (° C.) |
| FIG. 10 | FIG. 2, FIG. 5 | 6 | ~−5 | AFTER ELECTROLYTIC CELL | TAP WATER | NORMAL TEMPERATURE | 0.5 | NORMAL TEMPERATURE |
| FIG. 11 | FIG. 2, FIG. 5 | 6 | ~−50 | BEFORE ELECTROLYTIC CELL | RO-TREATED WATER | 70~90 | 0.5 | 70~90 |
| FIG. 13 | FIG. 2, FIG. 5 | 6 | ~−250 | BEFORE ELECTROLYTIC CELL | EXTRACT | 70~90 | 0.5 | 70~90 |
| FIG. 13 | FIG. 3(a) | 6 | ~−300 | BEFORE ELECTROLYTIC CELL | EXTRACT | 70~90 | 0.5 | 70~90 |
| FIG. 13 | FIG. 2, FIG. 7 | 6 | ~−290 | BEFORE ELECTROLYTIC CELL | EXTRACT | 70~90 | 0.5 | 70~90 |
| FIG. 13 | FIG. 3(b) | 6 | ~−310 | BEFORE ELECTROLYTIC CELL | EXTRACT | 70~90 | 0.5 | 70~90 |
| FIG. 13 | FIG. 3(c) | 6 | ~−330 | BEFORE ELECTROLYTIC CELL | EXTRACT | 70~90 | 0.5 | 70~90 |

Example 3

In this example, a system of adding water-soluble dietary fibers as one of polysaccharides that is the dissolved-hydrogen stabilizing agent to electrolytically reduced water will be described. In the same manner as in the example 2, extraction from a raw material for coffee was performed using an extraction system shown in FIG. 14A or 14B. After or before the electrolytic cell, water-soluble dietary fibers were added.

Table 4 summarizes results from a scheme of adding water-soluble dietary fibers after the electrolytic cell as a relationship between ORP and concentration. As the conof FIGS. 2 and 5. As the concentration of the stabilizing agent increased, the ORP was shifted to the more negative side.

FIGS. 14A, 14B, and 14C show the system of electrolyzing a heated solution to shorten the time between electrolysis and extraction. When the dissolved-hydrogen stabilizing agent is added, the electrode and the ion exchange resin/membrane may be contaminated. In order to wash this contamination, anode electrolytic water is introduced into a cathode electrolytic chamber in a certain period and the electrolytic chamber is washed, as shown in FIG. 14C.

TABLE 4

ORP OF ELECTROLYTIC EXTRACTION AND ADDITION OF DISSOLVED-HYDROGEN STABILIZING AGENT

| | ELECTROLYTIC CELL | | | | WATER SUPPLIED TO ELECTROLYTIC CELL | | | EXTRACT WATER |
|---|---|---|---|---|---|---|---|---|
| SYSTEM | STRUCTURE | CURRENT (A) | ORP (mV) | HEATING | WATER QUALITY | TEMPERATURE (° C.) | FLOW RATE (l/min) | TEMPERATURE (° C.) |
| FIG. 10 | FIG. 2, FIG. 5 | 6 | ~−5 | AFTER ELECTROLYTIC CELL | TAP WATER | NORMAL TEMPERATURE | 0.5 | ~90 |
| FIG. 14(a) | FIG. 2, FIG. 5 | 6 | ~−205 | BEFORE ELECTROLYTIC CELL | RO-TREATED WATER | ~90 | 0.5 | ~90 |
| FIG. 14(a) | FIG. 3.(a) | 6 | ~−280 | BEFORE ELECTROLYTIC CELL | RO-TREATED WATER | ~90 | 0.5 | ~90 |
| FIG. 14(b) | FIG. 2, FIG. 5 | 6 | ~−240 | AFTER ELECTROLYTIC CELL | RO-TREATED | NORMAL TEMPERATURE | 0.5 WATER | ~90 |
| FIG. 14(b) | FIG. 3.(a) | 6 | ~−340 | AFTER ELECTROLYTIC CELL | RO-TREATED | NORMAL TEMPERATURE | 0.5 WATER | ~90 |

Example 5 (Extract Electrolytic System Under Heating and Pressure)

FIG. 16 shows an extract electrolytic system under heating and pressure. In FIG. 16, water obtained by purifying tap water by the reverse osmosis membrane filter is heated in the heater (container) 2 to 70 to 90° C., and supplied to the cathode chamber 4 in the electrolytic cell 5, and the heated water is electrolyzed at the cathode. This water is supplied to the filter filled with coffee beans. The extract receiver is a sealed container and has a structure that is resistant to a pressure up to 3 atmospheric pressures, and prevents the volatilization of hydrogen molecules and contamination with air.

FIG. 17 shows such a structure that the dissolved-hydrogen stabilizing agent is added to the heater (container) 2 by the injector 121 and source water is heated. The source water is supplied to the cathode chamber 4 in the electrolytic cell 5, reduced by electrolysis at the cathode, and subjected to extraction by the filter filled with coffee beans. The extract is collected in the extract receiver 13 under pressure without volatilization of hydrogen molecules.

In FIG. 18, water purified by the reverse osmosis membrane filter 1 is reduced at the cathode of the cathode chamber 4 in the electrolytic cell 5. The liquid is heated by the heater (container) 2, and at the same time, the dissolved-hydrogen stabilizing agent is added by using the dissolved-hydrogen stabilizing agent injector 121.

This example describes that an extract having higher reducibility is produced by extraction under heating and pressure. FIGS. 16, 17, and 18 show the electrolysis extraction system under heating and pressure. In this system, the electrolytic cell having the combined structure of FIGS. 2 and 5 or the structure of FIG. 3B is used, and the fluorine-containing cation exchange membrane and the fluorine-containing cation exchange resin are used. The heat-resistant temperature of the fluorine-containing cation exchange resin is about 120° C. Electrolysis can be performed at a temperature about 100° C. or lower.

FIGS. 17 and 18 show the extraction system under heating and pressure using the dissolved-hydrogen stabilizing agent. In FIG. 17, the hydrogen stabilizing agent is added and the supplied water is heated before the electrolytic cell. In FIG. 18, the hydrogen stabilizing agent is added and the supplied water is heated after the electrolytic cell. As clear from the test results in Table 5, a negative ORP can be achieved by the extract electrolytic system under heating.

Example 6 (Compact and Simple Electrolytic System)

FIGS. 19A and 19B show an overview of a compact high-temperature extraction device that is formed by integrating an electrolytic device with an extractor. In FIG. 19A, a compact electrolytic cell 23 is connected below a compact extractor 21. The whole extract receiver acts as a cathode electrode 26, and is partly opened. A compact diaphragm 25 of fluorine-containing cation exchange membrane is attached to the receiver, and a compact anode electrode 24 comes into contact with the diaphragm. In FIG. 19B, the hydrogen stabilizing agent is added to the cathode chamber in the electrolytic cell. After that, electrolysis at the cathode and heating are performed. A cathode electrolytic solution is added to the extraction container, followed by extraction.

Example 7 (System Provided with Electrolytic Cell Circulation Line)

When a circulation line is provided around the cathode chamber 4 in the electrolytic cell of FIG. 20A, 20B, or 20C, the concentration of dissolved molecular hydrogen can be increased. In FIG. 20A, a circulation line of the cathode chamber was simply provided. FIG. 20B shows a system provided with a line of circulating the extract through the cathode chamber 4. In FIG. 20C, the ORP is further shifted to the negative side by circulating the extract itself through the cathode chamber 4.

Example 8 (Electrolysis Extraction System Provided with Natural Product Automatically Supplying Device)

FIGS. 21A and 21B show an electrolysis extraction system provided with a replenishing device 17 of a natural product for extraction automatically supplying a natural product for coffee extraction or the like. In FIG. 21A, a device of automatically supplying a raw material for coffee or the like is combined.

The system of FIG. 21B is used for extraction by heating electrolytically reduced water. During heating electrolytically reduced water, the dissolved-hydrogen stabilizing agent is added. In FIG. 21C, source water to which the dissolved-hydrogen stabilizing agent has been added is heated, and then supplied to the cathode chamber, to produce

TABLE 5

ORP OF EXTRACT AFTER ADDITION OF DISSOLVED-HYDROGEN STABILIZING AGENT AND HEATING

| SYSTEM | ELECTROLYTIC CELL | | | | WATER SUPPLIED TO ELECTROLYTIC CELL | | | EXTRACT WATER |
| --- | --- | --- | --- | --- | --- | --- | --- | --- |
| | STRUCTURE | CURRENT (A) | ORP (mV) | HEATING | WATER QUALITY | TEMPERATURE (° C.) | FLOW RATE (l/min) | TEMPERATURE (° C.) |
| FIG. 10 | FIG. 2, FIG. 5 | 6 | ~−5 | AFTER ELECTROLYTIC CELL | TAP WATER | NORMAL TEMPERATURE | 0.5 | ~90 |
| FIG. 17 | FIG. 2, FIG. 5 | 6 | ~−310 | BEFORE ELECTROLYTIC CELL | RO-TREATED WATER | ~90 | 0.5 | ~90 |
| FIG. 17 | FIG. 3.(b) | 6 | ~−380 | BEFORE ELECTROLYTIC CELL | RO-TREATED WATER | ~90 | 0.5 | ~90 |
| FIG. 18 | FIG. 2, FIG. 5 | 6 | ~−360 | AFTER ELECTROLYTIC CELL | RO-TREATED | NORMAL TEMPERATURE | 0.5 WATER | ~90 |
| FIG. 18 | FIG. 3(b) | 6 | ~−420 | AFTER ELECTROLYTIC CELL | RO-TREATED | NORMAL TEMPERATURE | 0.5 WATER | ~90 | electrolytically reduced water. The heated electrolytically reduced water is used for extraction.

Example 9 (Electrolysis Extraction System Provided with Three-Chamber Electrolytic Cell)

FIGS. 22A and 22B show an electrolysis extraction system using the three-chamber electrolytic cell. As shown in FIG. 22B, the dissolved-hydrogen stabilizing agent is added to a solution in an intermediate chamber circulation line in this system. The dissolved-hydrogen stabilizing agent is easily added in terms of the system.

INDUSTRIAL APPLICABILITY

According to the present invention, a natural-extract beverage that has excellent antioxidative action and negative oxidation-reduction potential can be produced. Accordingly, the present invention highly contributes to the promotion of health.

REFERENCE SIGNS LIST

1: reverse osmosis membrane device
11: tap water
2: heater (heating container)
21: heater
3: supply pump
4: cathode chamber
41: cathode electrode
42: cathode chamber inlet
43: cathode chamber outlet
5: electrolytic cell
51: diaphragm
52: fluorine-containing cation exchange membrane
6: anode chamber
61: anode electrode
62: anode chamber inlet
63: anode chamber outlet
7: filter
8: extract receiver
9: electrolytic extract receiver
10: ion exchange resin
12: dissolved-hydrogen stabilizing agent-adding tank
121: dissolved-hydrogen stabilizing agent injector
13: extract receiver under pressure
16: intermediate chamber
161: intermediate chamber inlet
162: intermediate chamber outlet
14: cation exchange membrane
14: pump for washing
15: ion exchange resin
17: replenishing device of a natural product for extraction
19: degassing device
21: compact extractor
22: filter
23: compact electrolytic cell
24: compact porous anode electrode
25: compact diaphragm
26: compact cathode electrode
27: compact porous cathode electrode
31: electrolytic cell-heating container
32: heater
33: compact dissolved-hydrogen stabilizing agent-adding apparatus
34: filter for increase in the concentration of dissolved molecular hydrogen
35: water softener

The invention claimed is:

1. A method for producing a natural-extract beverage by making coffee or tea with electrolytically reduced hot water containing hydrogen molecules, comprising making an extract of coffee or tea that an oxidation-reduction potential of the extract is made to be 0 mV or less by at least one means that suppresses volatilization of dissolved molecular hydrogen,
wherein the at least one means are selected from the group consisting of: means of heating source water with a heater incorporated in a cathode chamber of an electrolytic cell and using electrolytically reduced water obtained by electrolysis of heated source water with the electrolytic cell, with the electrolytically reduced hot water and means of adding to the electrolytically reduced water at least one dissolved-hydrogen stabilizing agent selected from polysaccharides and/or polyphenols.

2. The method for producing a natural-extract beverage according to claim 1, wherein the extract is further electrolyzed after making the extract via the means of using electrolytically reduced water obtained by electrolysis of heated source water.

3. The method for producing a natural-extract beverage according to claim 1, wherein the source water is degassed during or before heating when the means that suppresses volatilization of the hydrogen molecules is the means of using electrolytically reduced water obtained by electrolysis of heated source water.

4. The method for producing a natural-extract beverage according to claim 1, wherein the electrolytically reduced water is prepared by an electrolytic cell that includes a fluorine-containing cation exchange membrane as a diaphragm, and a porous anode electrode and a cathode electrode closely adhered to both sides of the diaphragm.

5. The method for producing a natural-extract beverage according to claim 4, wherein the electrolytically reduced water is prepared by electrolytically reducing water that has been treated by a reverse osmosis membrane.

6. The method for producing a natural-extract beverage according to claim 4, wherein the electrolytically reduced water is prepared by an electrolytic cell that is provided with a line of circulating the electrolytically reduced water.

7. The method for producing a natural-extract beverage according to claim 1, wherein the electrolytically reduced water is prepared by an electrolytic cell that includes a fluorine-containing cation exchange membrane as a diaphragm, and a porous anode electrode and an irregularity processed cathode electrode closely adhered to both sides of the diaphragm with the irregular face of the cathode electrode adhered to the diaphragm, and allows the source water to pass through the irregular face.

8. The method for producing a natural-extract beverage according to claim 1, wherein the electrolytically reduced water is prepared by an electrolytic cell that includes an anode electrode, a cathode electrode, and a diaphragm that is a fluorine-containing cation exchange membrane, and in which an ion exchange resin is filled in between the fluorine-containing cation exchange membrane and the cathode electrode.

9. The method for producing a natural-extract beverage according to claim 1, wherein the electrolytically reduced water is prepared by a three-chamber electrolytic cell that includes three chambers of an anode chamber, an intermediate chamber, and a cathode chamber, and has a structure in which the anode chamber, the intermediate chamber, and the cathode chamber are separated by a fluorine-containing cation exchange membrane, a porous anode electrode is closely adhered to the fluorine-containing cation exchange membrane on a side of the anode chamber, and a porous cathode electrode is closely adhered to the fluorine-containing cation exchange membrane on a side of the cathode chamber.

10. The method for producing a natural-extract beverage according to claim 1, wherein in a line of producing the electrolytically reduced water, means for degassing is incorporated in a line of heating before an electrolytic cell.

11. The method for producing a natural-extract beverage according to claim 10, wherein a line of circulating the electrolytically reduced water is provided with at least one means selected from the group consisting of means for treatment using a hollow fiber filter, means for providing a container filled with an ion exchange resin, and means for providing a container filled with zeolite.

* * * * *